(12) United States Patent
Weiss

(10) Patent No.: US 8,319,678 B2
(45) Date of Patent: Nov. 27, 2012

(54) SYSTEM AND METHOD FOR IMAGING OBJECTS

(75) Inventor: Nathan Weiss, Rehovot (IL)

(73) Assignee: Elta Systems Ltd., Ashdod (IL)

( * ) Notice: Subject to any disclaimer, the term of this patent is extended or adjusted under 35 U.S.C. 154(b) by 280 days.

(21) Appl. No.: 12/765,258

(22) Filed: Apr. 22, 2010

(65) Prior Publication Data

US 2010/0265117 A1 Oct. 21, 2010

Related U.S. Application Data

(63) Continuation of application No. PCT/IL2008/001219, filed on Sep. 11, 2008.

(30) Foreign Application Priority Data

Oct. 24, 2007 (IL) .......................................... 186884

(51) Int. Cl.
  *H01Q 3/00* (2006.01)
  *H01Q 3/02* (2006.01)
  *G01S 13/00* (2006.01)

(52) U.S. Cl. ............ 342/22; 342/27; 342/175; 343/757; 343/882

(58) Field of Classification Search ..................... 342/22, 342/25 R, 27, 175; 343/757–766, 869, 882
See application file for complete search history.

(56) References Cited

U.S. PATENT DOCUMENTS

| | | | | |
|---|---|---|---|---|
| 3,713,156 A | * | 1/1973 | Pothier | 342/22 |
| 4,583,095 A | * | 4/1986 | Peterson | 342/22 |
| 4,721,961 A | * | 1/1988 | Busignies et al. | 342/458 |
| 4,746,867 A | * | 5/1988 | Gunton | 324/329 |
| 4,967,199 A | * | 10/1990 | Gunton et al. | 342/22 |
| 5,357,259 A | * | 10/1994 | Nosal | 342/398 |
| 5,446,461 A | * | 8/1995 | Frazier | 342/22 |
| 5,673,050 A | * | 9/1997 | Moussally et al. | 342/22 |
| 5,859,609 A | * | 1/1999 | Sheen et al. | 342/179 |
| 6,130,641 A | * | 10/2000 | Kraeutner et al. | 342/179 |
| 6,137,437 A | * | 10/2000 | Lin et al. | 342/104 |
| 6,388,629 B1 | * | 5/2002 | Albats et al. | 343/757 |

(Continued)

FOREIGN PATENT DOCUMENTS

DE 102005016106 A1 10/2006

(Continued)

OTHER PUBLICATIONS

International Search Report, mailed May 8, 2009, from International Application No. PCT/IL2008/001219 filed on Sep. 11, 2008.

(Continued)

*Primary Examiner* — Jack W Keith
*Assistant Examiner* — Peter Bythrow
(74) *Attorney, Agent, or Firm* — Patentbar International, P.C.

(57) ABSTRACT

An active imaging system for imaging a target is described. The system includes a transmitting unit, a receiving unit, an antenna arrangement coupled to the transmitting unit and/or the receiving unit via a front end unit, and an image processing unit coupled to the receiving unit. The system also includes a control system coupled to the transmitting unit, the receiving unit and/or the image processing unit for controlling operation thereof. The antenna arrangement includes at least one rotating antenna synthetically forming a circular antenna. The image processing unit is configured for creating an image of the object by employing a synthetic aperture radar imaging algorithm.

11 Claims, 12 Drawing Sheets

U.S. PATENT DOCUMENTS

| | | | | |
|---|---|---|---|---|
| 6,603,422 | B2* | 8/2003 | Wright | 342/22 |
| 6,657,577 | B1* | 12/2003 | Gregersen et al. | 342/22 |
| 6,791,487 | B1 | 9/2004 | Singh et al. | |
| 6,850,201 | B2* | 2/2005 | Tietjen | 343/757 |
| 6,876,322 | B2* | 4/2005 | Keller | 342/22 |
| 6,965,340 | B1 | 11/2005 | Baharav et al. | |
| 6,969,844 | B2* | 11/2005 | Albats et al. | 250/234 |
| 6,992,616 | B2* | 1/2006 | Grudkowski et al. | 342/179 |
| 7,170,440 | B1* | 1/2007 | Beckner | 342/22 |
| 7,194,236 | B2* | 3/2007 | Lovberg et al. | 455/25 |
| 7,212,153 | B2* | 5/2007 | Rowe et al | 342/179 |
| 7,256,748 | B2* | 8/2007 | Tietjen | 343/763 |
| 7,280,068 | B2* | 10/2007 | Lee et al. | 342/22 |
| 7,365,672 | B2* | 4/2008 | Keller et al. | 342/22 |
| 7,391,362 | B2* | 6/2008 | Beckner | 342/179 |
| 7,405,692 | B2* | 7/2008 | McMakin et al. | 342/22 |
| 7,415,244 | B2* | 8/2008 | Kolinko et al. | 455/25 |
| 7,460,063 | B2* | 12/2008 | De Maagt et al. | 342/351 |
| 2002/0105455 | A1* | 8/2002 | Wright | 342/22 |
| 2005/0093733 | A1* | 5/2005 | Lovberg et al. | 342/22 |
| 2005/0110672 | A1* | 5/2005 | Cardiasmenos et al. | 342/27 |
| 2005/0122258 | A1* | 6/2005 | Blasing et al. | 342/179 |
| 2005/0195103 | A1* | 9/2005 | Davis et al. | 342/99 |
| 2005/0225493 | A1* | 10/2005 | Tietjen | 343/766 |
| 2006/0017605 | A1* | 1/2006 | Lovberg et al. | 342/22 |
| 2006/0097905 | A1* | 5/2006 | Friborg et al. | 342/22 |
| 2006/0214832 | A1* | 9/2006 | Lee et al. | 342/22 |
| 2007/0013575 | A1* | 1/2007 | Lee et al. | 342/52 |
| 2007/0132630 | A1* | 6/2007 | Beckner | 342/22 |
| 2008/0007451 | A1* | 1/2008 | De Maagt et al. | 342/351 |
| 2008/0174476 | A1* | 7/2008 | Detlefsen et al. | 342/25 A |
| 2009/0051586 | A1* | 2/2009 | Weinzierl et al. | 342/25 A |

FOREIGN PATENT DOCUMENTS

| | | | |
|---|---|---|---|
| DE | 102006006962 | * | 8/2007 |
| DE | 102006006962 A1 | | 8/2007 |
| EP | 1353404 | * | 10/2003 |
| EP | 1353404 A2 | | 10/2003 |

OTHER PUBLICATIONS

International Preliminary Report on Patentability, mailed Sep. 14, 2009, from International Application No. PCT/IL2008/001219 filed on Sep. 11, 2008.

Klausing, H. et al., "Feasibility of a synthetic aperture radar with rotating antennas (ROSAR)," IEEE International Radar Conference, May 7, 1990, pp. 51-56.

Rudolf, H. et al., "Combination of linear and circular SAR for 3-D features," Geoscience and remote sensing, 1997. IGARSS '97. Remote Sensing—A Scientific Vision for Sustainable Development, 1997 IEEE International Singapore Aug. 3, 1997, New York, NY, USA, IEEE, US, vol. 4, pp. 1551-1553.

Sheen, D. M. et al., "Concealed explosive detection on personnel using a wideband holographic millimeter-wave imaging system," Proceedings of SPIE—The International Society for Optical Engineering, V. 2755, 1996, pp. 503-513.

Tietjen, B. W., "The rolling radar", Radar Conference, 2005 IEEE International Arlington, VA, USA May 9-12, 2005, Piscataway, NJ, USA, IEEE, May 9, 205, pp. 16-21.

* cited by examiner

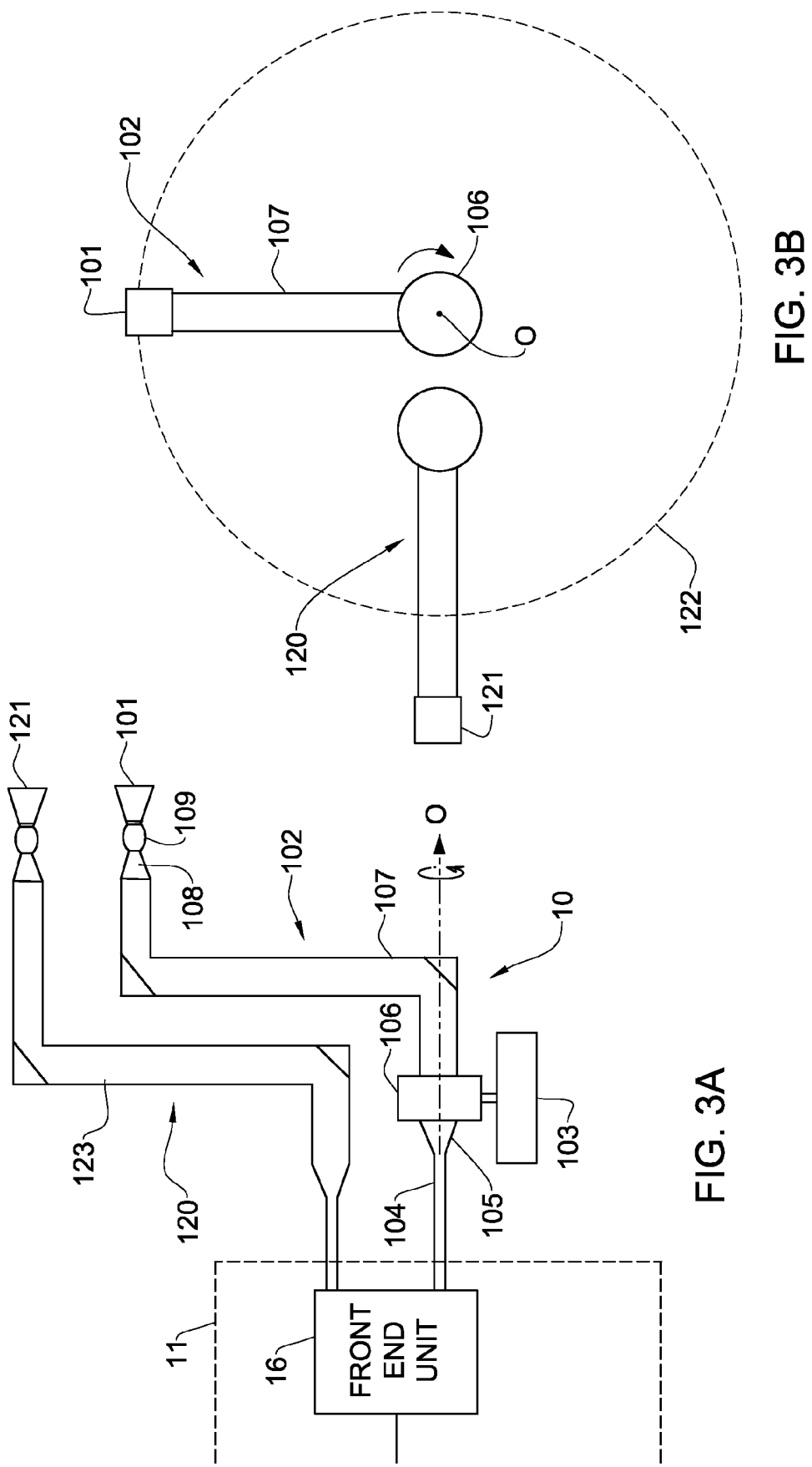

SYSTEM AND METHOD FOR IMAGING OBJECTS

RELATED APPLICATIONS

This application is a Continuation of International Application No. PCT/IL2008/001219 filed on Sep. 11, 2008, which claims priority to Israeli Patent Application No. IL186884 filed on Oct. 24, 2007, both of which are incorporated herein by reference in their entirety.

FIELD OF THE INVENTION

The present invention relates generally to detection and imaging systems, and in particular, to radio frequency imaging systems designed to find objects carried on human bodies.

BACKGROUND OF THE INVENTION

In many applications it is important to find objects that are carried by people and which can be concealed on their bodies. Detection systems are known which require an individual to pass through a fixed detector passageway (portal) equipped with magnetic sensors. When metallic objects of sufficient mass pass through the passageway, a warning signal is activated because a change in magnetic flux is detected. This type of system either detects or does not detect a metal object and sometimes makes no determination relative to the amount of metal present. Keys, jewelry, watches, and metal-framed eyeglasses may all trigger such a system.

While such magnetic detectors are capable of detecting metal objects passing through the detector passageway, such systems cannot determine whether the detected metal object is a threat object (e.g., a knife or a gun) or an innocuous (non-threat) object (e.g., keys, coins, jewelry, belt buckles). Moreover, these detection systems do not pinpoint the location of the metal objects on the individual's body. Likewise, these systems are useless in detection of modern threats posed by plastic and ceramic items and plastic and liquid explosives.

Moreover, there are situations when a person under surveillance need not be aware that he or she is being monitored. In such a case, the portal systems described above are not appropriate.

Another type of detection system also employs imaging techniques that acquire images of the detection space and then display the image to an operator. Moreover, imaging detection systems can use image recognition methods to convert the image into an indication (such as an audible or visual alarm). In order to recognize a specific threat object, the system has to compare the object with an electronic catalog of images of uniquely-shaped threat objects. In this case, unique orientations of the objects are also important, because an object may have a significantly different appearance if viewed from the sides, the top, etc. The observed uniqueness of a threat object also essentially depends on the image resolution of the system.

A good example of a concealed object imaging system that exhibits high image clarity is the cabinet x-ray system used at airports to screen carry-on luggage. Although very effective for certain security tasks, X-ray imaging can pose a serious health risk to living organisms due to X-ray exposure, and is therefore unacceptable to the public. On the other hand, RF radiation in the microwave and millimeter-wave (e.g., 5 GHz to 1 THz) range offers a possible solution for concealed weapon detection and imaging, because the RF radiation can easily penetrate clothing and also represents no known health threat to humans at moderate power levels (see, for example, U.S. Pat. No. 6,791,487 to Singh; U.S. Pat. No. 6,876,322 to Keller; U.S. Pat. No. 6,992,616 to Grudkowski et al; and U.S. Pat. No. 6,965,340 to Maharav at al.).

Specifically, U.S. Pat. No. 6,791,487 describes imaging methods and systems for concealed weapon detection. In an active mode, a target can be illuminated by a wide-band RF source. A mechanically scanned antenna, together with a highly sensitive wide-band receiver can then collect and process the signals reflected from the target. In a passive mode, the wide-band receiver detects back-body radiation emanating from the target and possesses sufficient resolution to separate different objects. The received signals can then be processed via a computer and displayed on a display unit thereof for further analysis by security personnel.

A wideband millimeter-wave imaging system is described in the article titled "Concealed explosive detection on personnel using a wideband holographic millimeter-wave imaging system," by Sheen et al., Proceedings of SPIE—The International Society for Optical Engineering, V. 2755, 1996, PP. 503-513. To form an image, Sheen et al. use a linear array of 128 antennas that can electronically scan over a horizontal aperture of 0.75 meters, while the linear array is mechanically swept over a vertical aperture of 2 meters. At each point over this 2-D aperture, coherent wideband data reflected from the target is gathered using wide-beamwidth antennas. The data is recorded coherently, and reconstructed (focused) using an image reconstruction algorithm that works in the near-field of both the target and the scanned aperture and preserves the diffraction limited resolution of less than one-wavelength. The wide frequency bandwidth is used to provide depth resolution, which allows the image to be fully focused over a wide range of depths, resulting in a full 3-D image.

U.S. Pat. No. 6,965,340 describes a security inspection system including a portal through which a human subject is capable of walking and a scanning panel including an array of antennas that are programmable with a respective phase delay to direct a beam of microwave illumination toward a target on the human subject. The antennas are further capable of receiving reflected microwave illumination reflected from the target. A processor is operable to measure an intensity of the reflected microwave illumination to determine a value of a pixel within an image of the human subject. Multiple beams can be directed towards the human subject to obtain corresponding pixel values for use by the processor in constructing the image.

U.S. Pat. No. 6,992,616 describes active imaging systems including an antenna apparatus configured to transmit toward and receive from a subject in a subject position, electromagnetic radiation. The antenna apparatus may move in a partial or continuous loop around the subject, toward or away from the subject, or in an opposite direction to an associated antenna apparatus. Antenna units in the antenna apparatus may be oriented at different angular positions along an array. Antenna arrays may also be formed of a plurality of array segments, and a group of arrays may be combined to form an antenna apparatus.

SUMMARY OF THE INVENTION

Despite the prior art in the area of imaging systems for detection objects concealed on human bodies, there is still a need in the art for further improvement in order to provide an imaging system capable of detecting different types of objects carried on a person, carried in briefcases and luggage, in packaging, storage containers and any other transportation means where threat objects may be smuggled or hidden.

There is also a need and it would be advantageous to have an imaging system, which unlike prior art systems, does not require a person to walk through a portal in order to determine the presence of a potentially dangerous object, but rather capable of remote imaging of threat objects out to a range of between about five meters to hundred meters so that a person under surveillance may not be aware that he or she is being monitored. It would also be desirable, that the imaging system would be able not only to display this image to an operator, but also to discriminate between different objects, and within seconds to alert the operator to potential threats, which is rapidly emerging as a necessity in such security screening applications.

The present invention partially eliminates disadvantages of conventional imaging techniques and provides a novel active imaging system for detecting and imaging a target. The target may include one or more objects that can be either visible or concealed by a clothing material. It should be understood that the target itself can be concealed by a wall that is transparent to electromagnetic radiation.

The system includes a transmitting unit, a receiving unit, an antenna arrangement coupled to the transmitting unit and/or the receiving unit via a front end unit, and an image processing unit coupled to the receiving unit. The system also includes a control system coupled to at least one of the following units: the transmitting unit, the receiving unit and the image processing unit.

The transmitting unit is configured to generate electromagnetic radiation signal in microwave wave frequency range for scanning the target. The receiving unit is configured to receive microwave radiation re-radiated from the target. The antenna arrangement is configured for transmitting and receiving electromagnetic radiation signal in the microwave wave frequency range.

According to the present invention, the antenna arrangement includes at least one rotating antenna synthetically forming a circular antenna. It should be noted that the term "circular antennas" in the present description and claims broadly refers to the antennas in which the synthetic aperture is formed during any periodic motion of the antenna, which would include, for example, oval motion, etc.

The image processing unit is configured for creating an image of the object by employing a synthetic aperture radar imaging algorithm. The control system is configured for controlling operation of the transmitting unit, the receiving unit and the image processing unit.

It should be noted that for the purpose of the present description and the claims, the term microwave radiation refers to alternating electromagnetic signals with frequencies between approximately 300 MHz and 1 THz, without derogation of the invention.

Examples of the target include, but are not limited to, persons, animals, briefcases and luggage, and combination thereof.

According to one embodiment of the invention, the antenna arrangement includes one unitary antenna rotating around an axis directed towards the target and operating for receiving and transmitting the electromagnetic radiation. The unitary antenna can be selected from a group including a horn antenna, a slot antenna, a strip antenna, a patch antenna, a parabolic antenna, a semiconductor antenna, etc. For example, a frequency of rotation of the unitary rotating antenna can be in the range of about 1 to 30 rev/sec.

According to another embodiment of the invention, the axis directed towards the target can in turn be rotated around at least one another axis, so as to provide a partial or full 3600 field-of-view image of a scene. For example, a frequency of rotation of the axis directed towards the target around another axis can be in the range of about 0.5 to 5 rev/sec.

According to yet another embodiment of the invention, antenna arrangement includes at least one transmitting antenna and at least one receiving antenna.

According to a further embodiment of the invention, the antenna arrangement includes a single transmitting antenna and a plurality of receiving antennas. For example, the receiving antennas can be rotating antennas, whereas the transmitting antenna can be a stationary antenna. Alternatively, the receiving antennas can be stationary antennas, whereas the transmitting antenna can be a rotating antenna.

According to still a further embodiment of the invention, the antenna arrangement includes a single receiving antenna and a plurality of transmitting antennas. In this case, the single receiving antenna can be a rotating antenna, whereas the transmitting antennas can be stationary antennas. Alternatively, the single receiving antenna can be a stationary antenna, whereas the transmitting antennas can be rotating antennas.

Examples of the transmitting antenna and the receiving antenna include, but are not limited to horn antennas, slot antennas, strip antennas, patch antennas, parabolic antennas, semiconductor antennas, etc. When desired, the antenna arrangement can be protected from the environment by a radome material.

According to an embodiment of the invention, the transmitting unit includes a variable frequency signal generator coupled to the control system, and configured for generating a reference microwave signal, and a modulator coupled to the variable frequency generator and to the control system. The variable frequency signal generator is configured for generating a reference microwave signal. The modulator is configured for modulating the reference microwave signal and producing a modulated signal.

According to an embodiment of the invention, the receiving unit includes a detector configured for demodulating a signal reradiated from the target, and a digital (A/D) converter coupled to the detector and configured for digitizing the signal produced by the detector.

According to an embodiment of the invention, the front-end unit includes a power splitter coupled to the modulator and the antenna arrangement, and a mixer coupled to the detector, to the power splitter, and to the antenna arrangement. The power splitter is configured to split the modulated signal into a first portion relayed to the antenna arrangement for transmitting and a second portion. The mixer is configured for mixing the second portion of the modulated signal with the microwave radiation re-radiated from the target and relaying the mixed signal to the detector.

According to a further embodiment of the invention, the front-end unit includes a power amplifier arranged between the splitter and the antenna arrangement, and a low noise amplifier arranged between the mixer and the antenna arrangement.

When desired, the image processing unit can be integrated with the control system on the basis of a host computer. According to an embodiment of the invention, the host computer can include a memory unit configured for storing data, a processor configured for operating instructions, and a monitoring system configured for presenting detected results.

The image processing unit can be preprogrammed by a mathematical model capable of analyzing an output signal of the detector and providing images of the object. When desired, mathematical model can be capable of discriminating between different objects located within the target, and alerting an operator to potential threats.

According to an embodiment of the invention, the antenna arrangement comprises a rotating arm that includes: an electromagnetic circular waveguide connected to the front-end unit, a quasi-optical transition element connected to the electromagnetic circular waveguide for providing quasi-optical to electromagnetic waveguide transition, a quasi-optical waveguide rotary joint, and a quasi-optical waveguide connected to the quasi-optical waveguide rotary joint at one end of the quasi-optical waveguide. This provision forms a rotating antenna by allowing the electromagnetic wave to enter or to exit the quasi-optical waveguide directly through an outer end of the quasi-optical waveguide.

According to another embodiment of the invention, the rotating arm further comprises an electromagnetic lens arranged at the outer end of the quasi-optical waveguide.

According to still an embodiment of the invention, the rotating arm further comprises another quasi-optical transition element, another circular waveguide downstream of said another quasi-optical transition element, and an antenna element connected to this another circular waveguide.

According to a further embodiment of the invention, the antenna arrangement further comprises a stationary arm including a stationary antenna. For example, the stationary arm can include a quasi-optical waveguide for coupling the stationary antenna to the front end unit. Alternatively, the stationary arm includes a regular RF electromagnetic waveguide for coupling the stationary antenna to the front end unit.

According to a further embodiment of the invention, the system further comprises a frequency multiplier downstream of the transmitting unit and upstream of the front end unit. According to this embodiment, the transmitting unit, the receiving unit, the control system, and the image processing unit can be mounted in a stationary portion of the system, whereas frequency multiplier, the front end unit and the antenna arrangement can be mounted in a rotating portion of the system. In this case, the stationary portion can be coupled to the rotating portion via a lower frequency rotary joint, e.g., slip rings, waveguide rotary joint, fiber optic rotary joint, etc. For example, the rotating portion is mounted on a disk or a ring.

According to still a further embodiment of the invention, the imaging system of the present invention can comprise a video camera. For example, the video camera can be arranged outside the rotation radius of the rotating antenna.

According to another aspect of the present invention, there is provided a method for imaging a target including an object concealed by a clothing material. The method comprises:

generating and transmitting an electromagnetic radiation signal in microwave wave frequency range for scanning the target;

collecting microwave radiation re-radiated from the target by employing at least one rotating antenna synthetically forming a circular antenna; and controlling operation of the transmitting unit and receiving unit for creating an image of the concealed object by employing a synthetic aperture radar imaging algorithm.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 3A is a schematic side view of the antenna arrangement, according to another embodiment of the present invention;

FIG. 3B is a schematic front view of the antenna arrangement 10 of FIG. 3A;

DETAILED DESCRIPTION OF THE PREFERRED EMBODIMENTS

Figure 1:
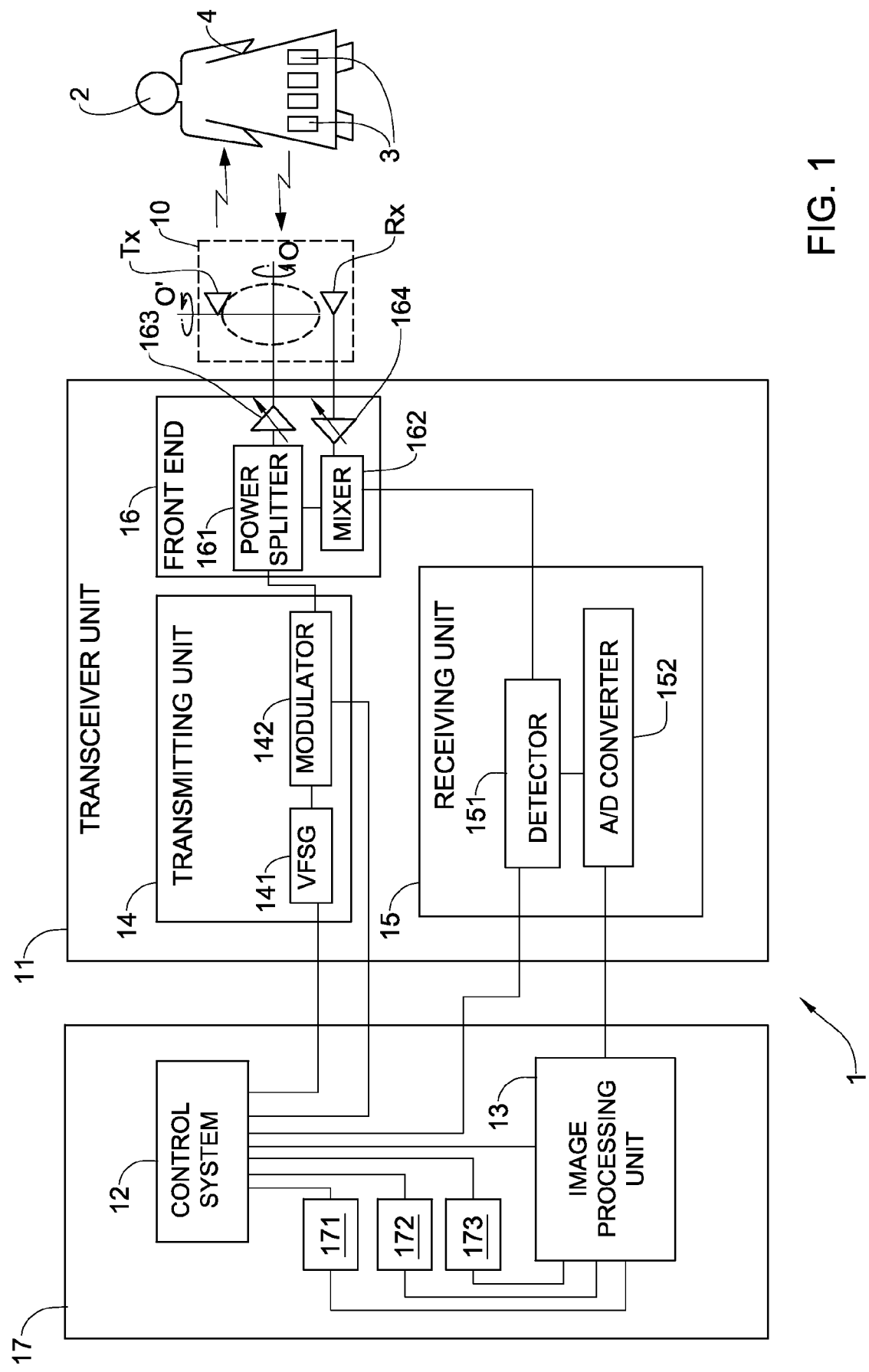
FIG. 1 is a schematic block diagram of an imaging system for imaging a target is illustrated, according to one embodiment of the invention.

The principles and operation of a system for imaging visible and concealed objects according to the present invention may be better understood with reference to the drawings and the accompanying description. It should be understood that these drawings are given for illustrative purposes only and are not meant to be limiting. It should be noted that the figures illustrating various examples of the system of the present invention are not to scale, and are not in proportion, for purposes of clarity. It should be noted that the blocks as well other elements in these figures are intended as functional entities only, such that the functional relationships between the entities are shown, rather than any physical connections and/or physical relationships. The same reference numerals and alphabetic characters will be utilized for identifying those components which are common in the imaging system and its components shown in the drawings throughout the present description of the invention.

Referring to FIG. 1, a schematic block diagram of an active imaging system 1 for imaging a target 2 including an object (or objects) 3 is illustrated, according to one embodiment of the invention. The object 3 can be either visible or concealed by a clothing material 4. The system 1 includes an antenna arrangement 10 including one or more antennas, a transceiver unit 11 coupled to the antenna arrangement 10, and a control system 12 coupled to the transceiver unit 11 and configured for management of operation of the transceiver unit 11.

The antenna arrangement 10 is configured for transmitting electromagnetic radiation signal towards the target 2, and for receiving electromagnetic radiation reradiated (reflected or scattered) from the target 2. The target 2 may include one or more persons, animals, briefcases and luggage, and/or combination thereof. For example, if a person is a target for imaging, then the objects that are carried by the person can include such items as watches, keys, jewelry, coins, pocket or other knives, clothing accessories, guns, or any other items that can be imaged.

Electromagnetic radiation may be selected from the frequency range in the microwave frequency range, for example, between about 300 megahertz (MHz) and about 1 terahertz (THz). Such radiation may be either at a fixed frequency or over a range or set of frequencies using several modulation types, e.g. chirp, pseudorandom frequency hop, pulsed, frequency modulated continuous wave (FMCW), or continuous wave (CW), etc.

According to the invention, at least one antenna of the antenna arrangement 10 rotates in operation to form a synthetic aperture. For example, a frequency (number of revolutions per second) of rotation of the antenna can be in the range of 1 to 30 rev/sec.

According to one embodiment of the invention, the antenna arrangement 10 has only one unitary antenna (i.e., an antenna which is common for receiving and transmitting). In this case, the unitary antenna participates in a rotation motion about an axis O. According to another embodiment, when the antenna arrangement 10 includes two or more antennas, at least one antenna of the antenna arrangement 10 participates in a rotation motion about the axis O.

According to one embodiment of the invention, the axis O is directed towards the target 2. According to another embodiment of the invention, the axis O is itself rotated around another axis O', so as to provide a partial or full 360° azimuthal and/or elevational field-of-view image of a scene. For example, a frequency of rotation of the axis O around the axis O' can be in the range of 0.5 to 5 rev/sec. Various configuration of the antenna arrangement 10 will be described hereinbelow.

It should be relevant to note here that although prior art techniques also teach to use rotating antennas for imaging objects, these techniques employ a different concept. Specifically, the prior art techniques are configured to image an object from close up by surrounding the object with a moving antenna and synthetically producing an aperture which nearly surrounds the object partially or entirely. For example, a cylindrical aperture can synthetically be produced for surrounding the object being imaged.

The present invention, on the other hand, uses SAR to synthetically produce one or more circular antennas which are supposed to be the sparse realization of a disk antenna. In other word, one or more circles formed by the rotating antennas arranged at various distances from the center of rotation correspond to a sparse implementation of the disk antenna, where each rotating antenna is a SAR implementation of the circle. Thus, contrary to the prior art techniques, the present application uses the circular SAR in which the antennas transmits radiation perpendicular to the plane of the circles rather than into the interior of the circle.

Many variations of the antenna arrangement 10 are possible and will be described hereinbelow, although for simplicity of the drawing only one transmitting antenna Tx and one receiving antenna Rx are shown in FIG. 1. Generally, the antenna arrangement 10 may include one or more transmitting antennas and one or more receiving antennas. For example, the antenna arrangement 10 can utilize a unitary antenna element that is used for both transmitting the microwave electromagnetic radiation (interrogation signal) to irradiate the target, and receiving the re-radiated microwave radiation produced by the target in response to the microwave interrogation signal. According to another example, the antenna arrangement 10 can include a plurality of receiving antennas that may receive radiation in response to transmission by a single transmitting antenna. In this case, the receiving antennas can be rotating antennas, whereas the transmitting antenna can be a stationary antenna or vice versa. Likewise, the antenna arrangement 10 may include a single receiving antenna that may receive radiation in response to transmission by a plurality of transmitting antennas. Accordingly, the single receiving antenna can be a rotating antenna, whereas the transmitting antennas can be stationary antennas or vice versa. When desired, both types of antennas (i.e., transmitting antennas and receiving antennas) can be rotating antennas.

The antennas may be of any appropriate type configured to transmit or receive electromagnetic radiation of like polarization or unlike polarized waveforms, such as plane, elliptical, or circular polarization, and may have narrow or broad angular radiation beam patterns, depending on the application. Examples of the transmitting antennas and the receiving antennas suitable for the purpose of the present invention include, but are not limited to, horn antennas, slot antennas, strip antennas, patch antennas, parabolic antennas, semiconductor antennas, etc. When required, the antenna arrangement 10 may be protected from the environment by a suitable radome material which may be part of the antenna arrangement 10, or separate, depending on the mechanical motion of the antennas that is required. Various embodiments of implementation of the antenna arrangement 10 will be described hereinbelow.

The transceiver unit 11 includes a transmitting unit 14 and a receiving unit 15 coupled to a front-end unit 16. The transmitting unit 14 includes a variable frequency signal generator (local oscillator) 141 coupled to the control system 12 and to a modulator 142 coupled to the control system 12. According to this embodiment, the variable frequency signal generator 141 can operate, for example, in a broad frequency range of 1 GHz to 300 GHz. The receiving unit 15 includes a detector 151 coupled to the control system 12 and to the front-end unit 16, and configured for demodulating a signal provided by the front-end unit 16. The receiving unit 15 includes also a digital (A/D) converter 152 coupled to the detector 151.

The front-end unit 16 includes a power splitter 161 coupled to the modulator 142 and configured to split the signal from the modulator 142 into two portions relayed to a transmitting antenna Tx of the antenna arrangement 10 and to a mixer 162 which is coupled to the splitter 161 and a receiving antenna Rx of the antenna arrangement 10. When required, the front-end unit 16 can include a power amplifier 163 arranged between the splitter 161 and the antenna arrangement 10 and a low noise amplifier 164 arranged between the mixer 162 and a transmitting antenna Tx of the antenna arrangement 10. It should be noted that although the transmitting antenna Tx is shown in FIG. 1 as a rotating antenna and the receiving antenna Rx is shown as a stationary antenna, when desired, the transmitting antenna Tx can be a stationary antenna while the receiving antenna Rx can be a rotating antenna, mutatis mutandis. Likewise, both the transmitting antenna Tx and the receiving antenna Rx can be rotating antennas.

In operation, the variable frequency generator 141 generates a microwave reference signal (local oscillator signal) which is modulated by the modulator 142. The modulated signal can be represented by a variety of waveforms. Examples of the waveforms include, but are not limited to, a step frequency pulsed signal comprising a set of certain frequencies $f_1, f_2, \ldots, f_n$ generated cyclically, a Linear Frequency Modulation (LFM) signal within a relatively long pulse, etc. Generally, any wideband signal covering the desired frequency bandwidth is suitable for the purpose of the invention.

The modulated signal from the modulator 142 is fed to the power splitter 161, thereby providing the reference signal to the antenna arrangement 10 and to the mixer 162. On the way to the antenna arrangement 10 the reference signal can be amplified (when required) by a power amplifier 163, and then is fed to the transmitting antenna Tx. The transmitting antenna Tx converts this signal into an open space electromagnetic field and irradiates the target 2.

The target 2 reflects and/or scatters the incident electromagnetic wave and forms a re-radiated electromagnetic wave indicative of the object(s) 3. The receiving antenna Rx intercepts a part of the electromagnetic field scattered by the target 2 and produces an electromagnetic signal based on the intercepted electromagnetic waves. This electromagnetic signal is relayed to the mixer 162 where it is mixed with the reference signal which (in the embodiment shown, corresponding to an implementation of an LFM waveform) is obtained from the power splitter 161, thereby to bring the received signal down to a lower frequency signal (baseband signal). It should be understood that when desired, another local oscillator (not shown) at a slightly different frequency than the variable frequency generator 141 can be employed in the imaging system, thereby to provide an intermediate frequency (IF) signal. The lower frequency signal (baseband signal or IF signal) is relayed to the receiving unit 15 for demodulation by the detector 151, and for conversion the detected signal into digital format by the A/D converter receiving unit 152.

When required the electromagnetic signal provided by the antenna arrangement 10 can be amplified by a low noise amplifier 164 before relaying to the mixer 162. It should be understood that gains of the amplifiers 163 and 164 may, inter alia, depend on RF human safety issues, power budget required by the system, signal-to-noise ratio and requirements to reduce a power consumption of the system 1.

The imaging system 1 also includes an image processing unit 13 coupled to the A/D converter 152 and to the control system 12, and configured for receiving signals generated by the receiving unit 15 and creating an image of the target 2 and/or object(s) 3 by employing a suitable synthetic aperture radar (SAR) imaging algorithm. Various SAR and inverse SAR algorithms are known per se, and therefore will not be expounded herebelow.

Although the image processing unit 13 is shown as a separate unit, it should be understood that when desired, the image processing unit 13 can be integrated with the control system 12. The control system 12 and the image processing unit 13 can, for example, be implemented on the basis of a host computer 17 having, inter alia, such known utilities as a memory unit 171 configured for storing data, a processor 172 (data acquisition and processing utility) configured for operating instructions, and a monitoring system 173 configured for presenting the detected results. The monitoring system 173 can include a display, printer and/or other monitoring devices (not shown). The processor 172 is preprogrammed by a suitable mathematical model embodied as hardware, firmware or software, and capable of analyzing the received data (i.e., output signal of the A/D converter 152) and providing images of the target 2 and object(s) 3. When desired, the mathematical model can be capable of discriminating between different objects located within the target, and alerting an operator (not shown) to potential threats.

When desired, the host computer 17 can be integrated with the transceiver unit 11. Alternatively, the transceiver unit 11 can be a stand alone-device or a part of an imaging system, operated remotely by a local processor or via a network management. In such a case, the system can use an external host PC (not shown) coupled to the transceiver unit via a network.

It is known that in the millimeter wave frequency range of about 30 GHz-1 THz there are serious problems associated with losses on coaxial cable lines as well as in conventional rotary joints, such as slip rings, waveguide rotary joint, fiber optic rotary joint, etc. The most common way to overcome this problem is to transfer such electromagnetic signals via electromagnetic waveguides. However, due to the fact that the antenna arrangement 10 always includes one or more rotating antennas that may operate within such millimeter wave microwave radiation range, special care should be taken when for transferring the electromagnetic energy between stationary components and rotating components of the system.

In particular, the coupling of a rotating electromagnetic waveguide to a stationary electromagnetic waveguide is difficult to accomplish using a waveguide with a rectangular cross-section, since it is difficult to match the rotating and the stationary waveguide's geometry at all rotation angles. If, for example, these waveguides are matched at some angle, then, at a 90 degree angle the rectangles will be at 90 degrees to each other, and thus only relatively little signal can pass through.

It should be noted that using a waveguide with a circular cross-section for transferring electromagnetic radiation to a rotating antenna is also not practical, if a configuration of the circular waveguide requires making bends in the waveguide. Indeed, the losses for 90 degree bends of a circular waveguide are too large to be tolerated, while a more gentle bend may make the whole system relatively large physically.

According to one approach, the problem of transferring a millimeter wave microwave electromagnetic signal between the rotating and stationary components is overcome by transferring such a signal via a quasi-optical waveguide (also known as an overmoded waveguide).

Figure 2:
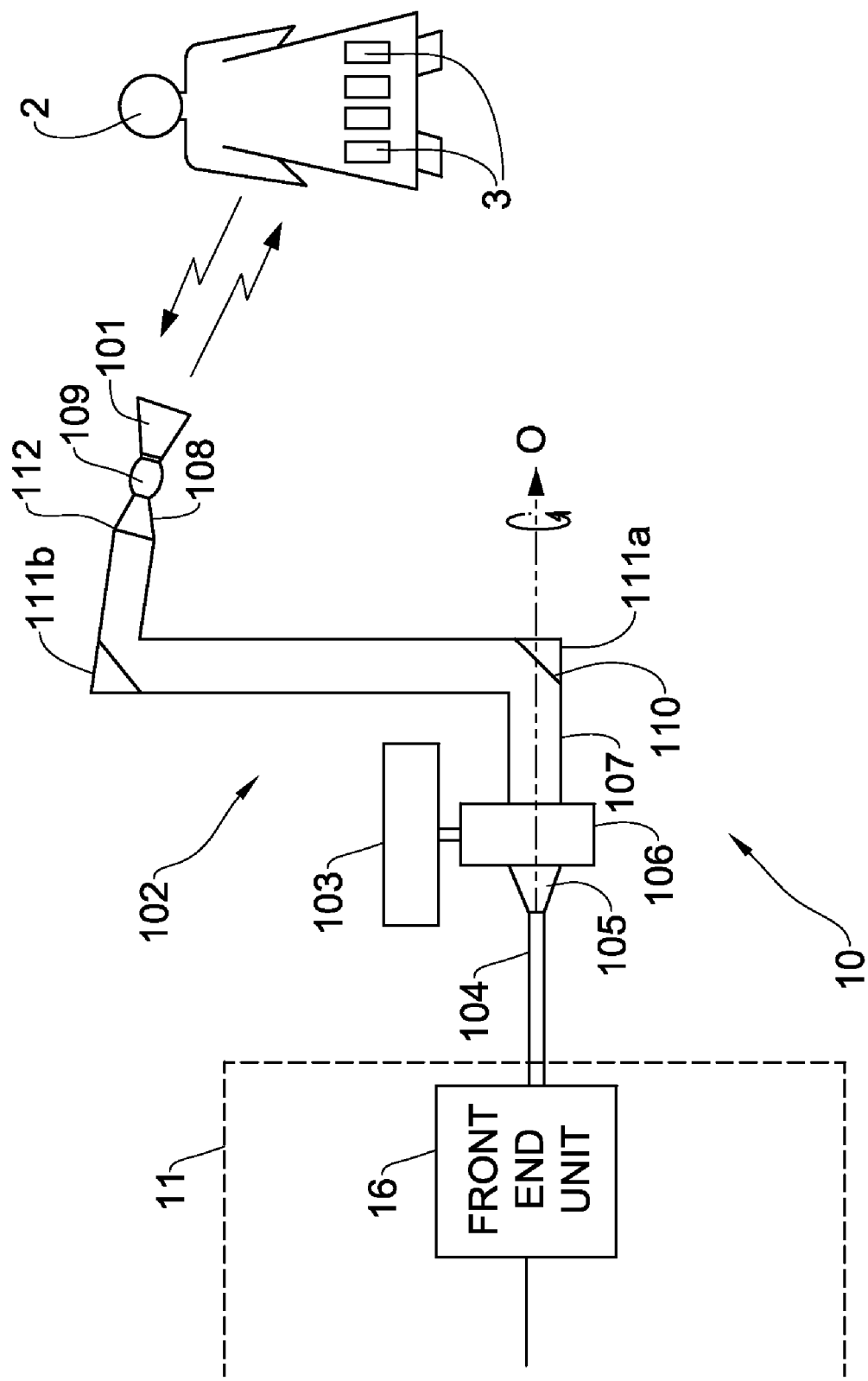
FIG. 2 is a schematic side view of an antenna arrangement of the system shown in FIG. 1, according to one embodiment of the present invention.

Referring to FIG. 2, a schematic side view of the antenna arrangement 10 is illustrated, according to one embodiment of the present invention. According to this embodiment, the antenna arrangement 10 includes a single antenna element 101 mounted at an outer end 112 of a rotating arm 102 whose axis of rotation O is directed towards the target 2. In rotation, the antenna element 101 thus generates a synthetic circular aperture around the circumference of the circle produced by the rotating arm 102. The antenna element 101 is used for both transmitting the microwave electromagnetic radiation (interrogation signal) to irradiate the target, and receiving the re-radiated microwave radiation produced by the target in response to the microwave interrogation signal.

The antenna arrangement 10 includes a rotating mechanism 103 equipped with a motor (not shown), which rotates the arm 102 about the axis of rotation O.

According to this embodiment of the invention, the rotating arm 102 includes an electromagnetic circular waveguide 104 connected to the front-end unit (16 in FIG. 1), a quasi-optical transition element 105 connected to the electromagnetic waveguide 104 for providing quasi-optical to electromagnetic waveguide transition, a quasi-optical waveguide rotary joint 106, and a much larger aperture waveguide known as a quasi-optical waveguide 107 connected to the quasi-optical waveguide rotary joint 106 at one end of the quasi-optical waveguide 107. In such a configuration, the electromagnetic wave can enter or exit the quasi-optical waveguide directly through the outer end (feed end) 112 of the quasi-optical waveguide 107. However, if required an electromagnetic lens (not shown) can be used at the outer end.

When desired, another quasi-optical transition element 108 can be placed for transition of the electromagnetic wave back to another circular waveguide 109 followed by the antenna element 101 (e.g., a horn antenna).

It should be noted that the electromagnetic waveguide connecting the antenna arrangement 10 to the front-end unit (16 in FIG. 1) can also be a rectangular waveguide. However, in this case an additional conventional transition element (not shown) should be used between the rectangular waveguide and the quasi-optical transition element 105, in order to make the transition from rectangular to circular configuration.

In operation for transmission, an electromagnetic wave provided by the front-end unit 16 is relayed to the electromagnetic waveguide 104. The signal then enters the quasi-optical transition element 105 in which it propagates into the quasi-optical waveguide rotary joint 106 (maintaining its polarization), and then into the quasi-optical waveguide 107. The beam then propagates in this quasi-optical waveguide.

It should be noted that in a quasi-optical (overmoded) waveguide the electromagnetic signal is not restricted to a single waveguide mode but rather propagates within the waveguide as a nearly free electromagnetic signal. The walls of the quasi-optical waveguide, which have typically a circular cross-section and of a size much larger than the wavelength, act to limit the transverse spreading of the electromagnetic wave.

It should be noted that when propagating in a quasi-optical waveguide, the beam can be made to undergo 90 degree bends using a mirror 110. The mirror 110 at microwave and millimeter wave frequencies can, for example, be a piece of metal. Thus, the ability to make 90 degree bends is the main advantage of quasi-optical waveguides over electromagnetic waveguides. As mentioned above, conventional circular electromagnetic waveguides with 90 degree bends do not support lossless electromagnetic transmission. As shown in FIG. 2, the quasi-optical waveguide 107 includes two bends, such as a bend 111a and a bend 111b. For example, the bends 111a and 111b can have values of 90 degrees. When desired, the bend 111b can have a value somewhat greater than 90 degrees, in order to direct the beam to a more central spot on the scene throughout the rotation.

One additional advantage of the rotating arm having quasi-optical configuration is in the fact that it preserves the polarization of the electromagnetic signal throughout the circulation of the antenna.

The final signal exits the quasi-optical waveguide 107 at the outer end 112 either directly or via conversion back to a circular waveguide 109, and then to the antenna element 101.

It should be understood that the quasi-optical antenna arrangement shown in FIG. 2 can operate in receiving mode as well. In this case, an electromagnetic signal enters the quasi-optical waveguide 107 either directly (through the outer end 112), which in this case receives the electromagnetic radiation re-radiated from the target, or through an electromagnetic lens.

Likewise, when the outer end 112 is equipped with another quasi-optical transition element 108, the circular waveguide 109, and the antenna element 101, the re-radiated electromagnetic radiation enters through the antenna element 101 and then passes in succession through the circular waveguide 109, the optical transition element 108, and the quasi-optical waveguide 107 (where the beam makes its way through the two bends 111a and 111b). After the quasi-optical waveguide 107 the beam passes through the quasi-optical waveguide rotary joint 106 followed by the quasi-optical transition element 105, and then the electromagnetic circular waveguide 104 from which the signal is relayed to the front-end unit 16.

According to an embodiment of the invention, the transmitting and receiving units operate in FMCW (frequency modulated continuous wave) mode in which transmission and reception occur simultaneously. In such a case it is not always possible to achieve sufficient sensitivity using the same transmitting and receiving antenna as shown in FIG. 2, due to reflected signals produced by the transmitting antenna into the receiving channel (i.e., reflections at waveguide connections and antenna connections, as well as leakage at the rotary joint). In such cases, it would be preferably to work with separate transmitting and receiving channels.

Referring to FIG. 3A and FIG. 3B, schematic side and front views of the antenna arrangement 10 are illustrated, according to another embodiment of the present invention. According to this embodiment, the antenna arrangement 10 employs separate transmitting and receiving channels, e.g., as shown in FIG. 1. The antenna arrangement of this embodiment differs from the antenna arrangement shown in FIG. 2 in the fact that it further includes a second arm 120. According to this embodiment, the second arm 120 is a stationary arm coupling a second (stationary) antenna 121 to the front end unit 16. As shown in FIG. 3A, the stationary antenna 121 is maintained in the vicinity of the rotating arm 102, while at a place which is arranged at a distance from the axis of rotation O larger than the radius of a circle 122 formed by the rotating antenna 101.

According to one embodiment of the invention, the stationary (second) arm 120 utilizes a quasi-optical waveguide 123 for transmission millimeter wave radiation and includes the same components as the rotating arm 102 with the exception of a quasi-optical waveguide rotary joint 106.

Owing to the fact that the stationary arm 120 does not require to couple rotating components of the system to its stationary components, the stationary arm 120 can also be formed of a regular RF electromagnetic waveguide (not shown). However, when the configuration of the stationary arm requires 90 degree bends, preferably, the electromagnetic waveguide has a rectangular cross-section rather than a circular cross-section.

For example, the rotating antenna 101 can be a receiving antenna, whereas the stationary antenna 121 can be a transmitting antenna. Alternatively, the rotating antenna 101 can be a transmitting antenna, whereas the stationary antenna 121 can be a receiving antenna, mutatis mutandis.

Figure 4B:
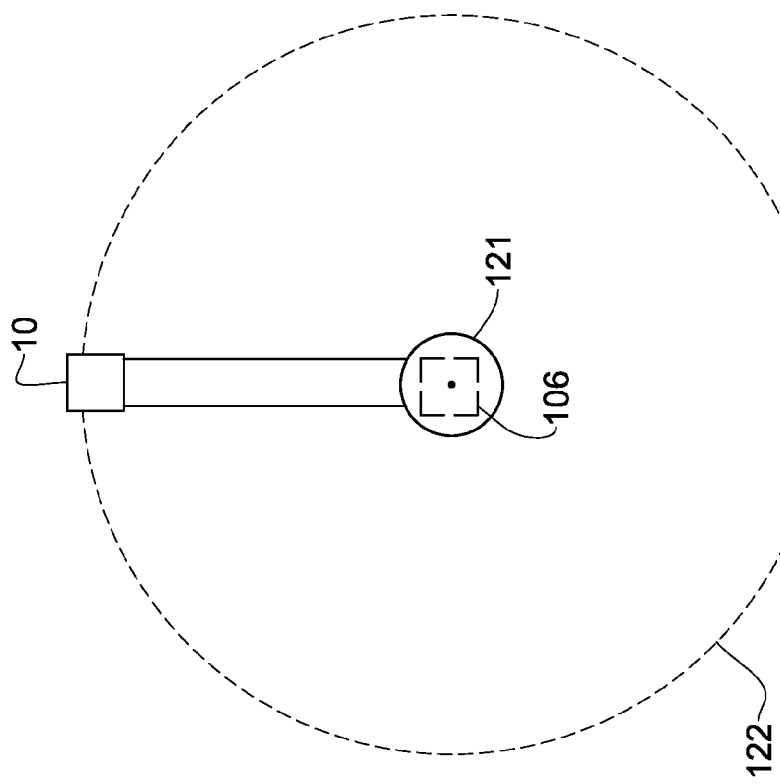
FIG. 4B is a schematic front view of the antenna arrangement 10 of FIG. 4A.
Figure 4A:
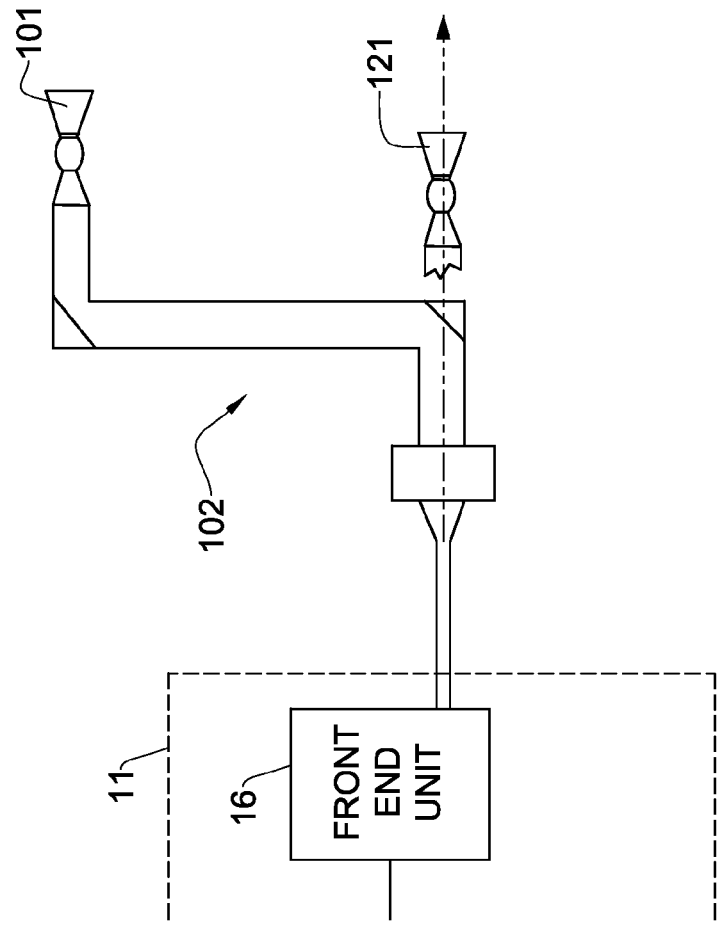
FIG. 4A is a schematic side view of the antenna arrangement, according to yet another embodiment of the present invention.

It should be understood that when desired, the stationary antenna 121 can be placed ahead of the rotating arm 102 at any distance from the axis of rotation O shorter than the radius of the circle 122, e.g., in the center of the circle 122, as shown in FIGS. 4A and 4B.

Further, according to another approach, the difficulties of transferring the millimeter microwave signal between stationary components of the system and rotating components of the system can also be overcome by mounting all the higher frequency components of the imaging system together with frequency multiplier and frequency down-converter on a rotating portion of the imaging system, while maintaining all the lower frequency components on the system's stationary portion. In this case, in the transmitting mode, the frequency multiplier (arranged on the rotating portion) can perform conversion from "lower" frequency to "higher" frequency. Accordingly, in the receiving mode, the down-converter (arranged on the rotating portion) can perform conversion from "higher" frequency to "lower" frequency. The actual values of the lower frequency can be determined as the frequency for which the losses in the connectors and rotary joints are of an acceptable magnitude. For example, the lower frequency hereinafter can be selected as the frequency below than 15 GHz, whereas the higher frequency can be selected as the frequency greater than 30 GHz. In such a case, only the lower frequency signal will be transferred between the rotating components and the stationary components of the system, and this transfer can be made by using ordinary lower frequency rotary joint techniques, e.g., via slip rings.

Figure 5:
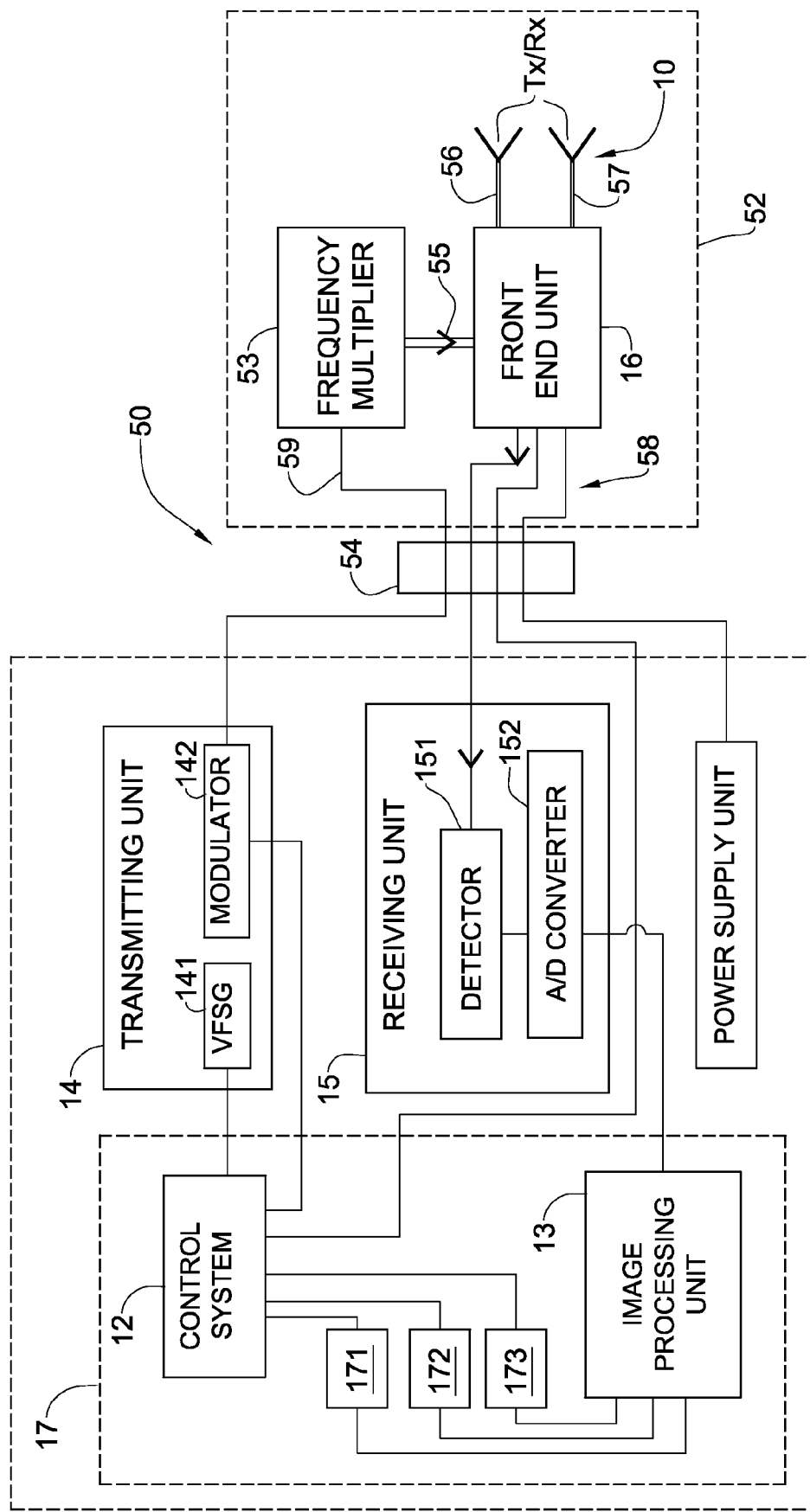
FIG. 5 illustrates a schematic block diagram of an embodiment of the imaging system of the invention in which higher frequency components are arranged at a rotating portion, whereas lower frequency components are arranged at a stationary portion.

FIG. 5 illustrates schematically an example of how this split between lower frequency components and higher frequency system's components of a system 50 can be implemented. In this example, a stationary portion 51 of the system 50 comprises the transmitting unit 14, the receiving unit 15, and the host computer 17. The transmitting unit 14 includes the variable frequency signal generator (VFSG) 141 and the modulator 142. The receiving unit 15 includes the detector 151 and the A/D converter 152. The host computer 17 includes, inter alia, the control system 12 for controlling the VFSG 141 and the modulator 142, and the image processing unit 13 for creating an image of an object (not shown). In this example, the VFSG 141 is a lower frequency signal generator operating at the microwave frequency range below than 15 GHz, e.g., at X-band.

On the other hand, a rotating portion 52 of the system 50 comprises a frequency multiplier 53 and the front end unit 16 coupled to the multiplier 53 via an electromagnetic waveguide 55. The front end unit 16 is coupled to the antenna arrangement 10 including Tx and Rx antennas via electromagnetic waveguides 56 and 57, respectively. The multiplier 53 is coupled to the transmitting unit 14 arranged at the stationary portion 51 via a low frequency rotary joint 54. The low frequency rotary joint 54 is also used for coupling the front end unit 16 to receiving unit 15, the control system 12, and to a power supply unit.

As a result of the split of the system 50 on rotating portion 52 and stationary portion 51, only relatively low frequency signals need to be transferred between the stationary portion and the rotating portion. The list of these signals, inter alia, includes: lower microwave (e.g., X-band) signals transferred from the transmitting unit 14 to the multiplier 53; a baseband signal transferred from the front end 16 to the receiving unit 15; control signals provided from the control system 12 to the front end 16; and electric power signals. As a result, there is no need to use a rather expensive quasi-optical waveguide rotary joint, since a comparatively inexpensive low frequency rotary joint can be utilized for these frequencies, e.g., slip rings.

Figure 6B:
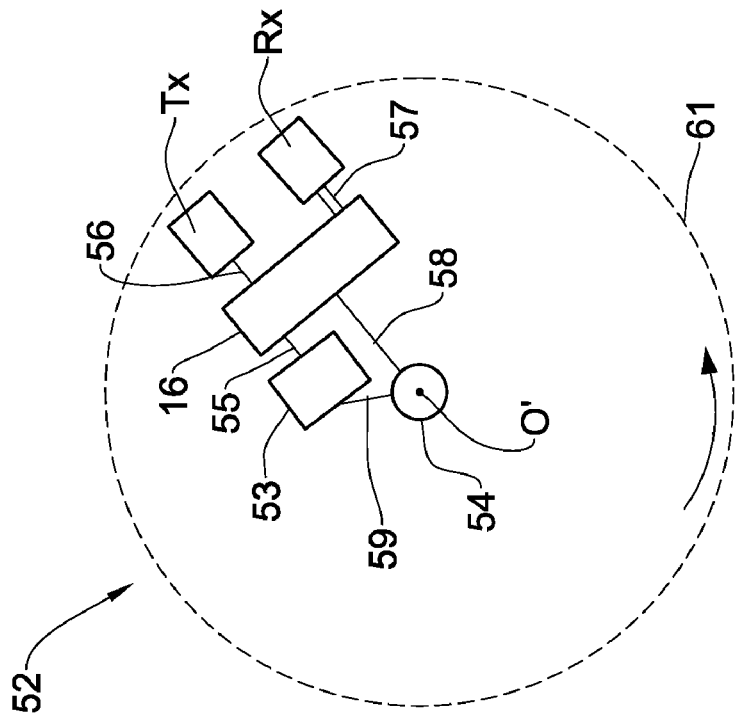
FIG. 6A and FIG. 6B illustrate schematic front and rear views of the rotating portion of the system shown in FIG. 5, correspondingly, according to one embodiment of the present invention.
Figure 6A:
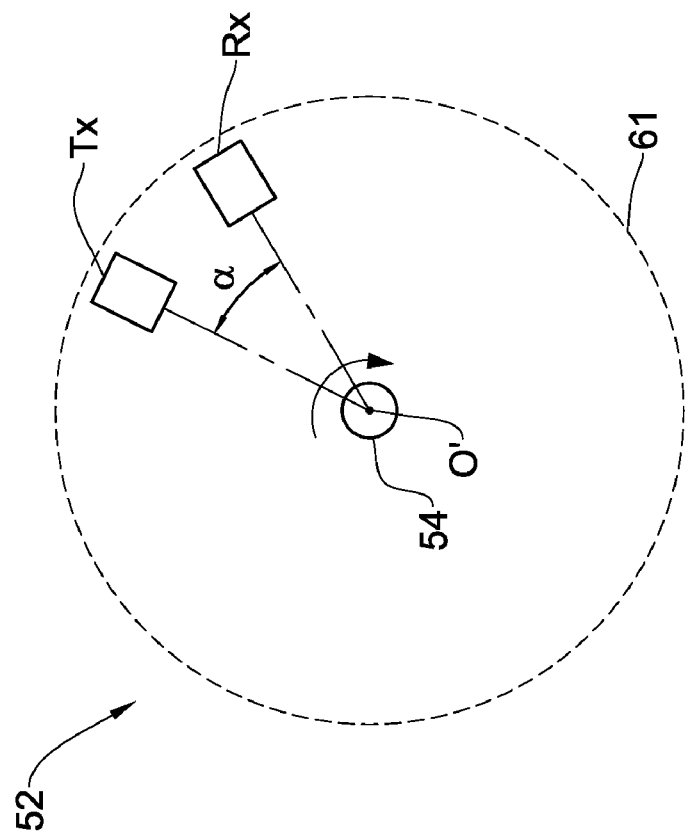

Referring to FIG. 6A and FIG. 6B, schematic front and rear views of rotating portion 52 of the system shown in FIG. 5 are illustrated, correspondingly, according to one embodiment of the present invention. According to this embodiment, the rotating portion 52 includes transmit Tx and receive Rx antennas mounted on a rotating disk 61 together with the front end unit 16 and the frequency multiplier 53. In operation, a rotation frequency (number of revolutions per second) of the disk 61 can, for example, be in the range of 1 to 30 rev/sec. The Tx and Rx antennas are coupled to the front end unit 16 via electromagnetic waveguides 56 and 57. The front end unit 16 is coupled to the stationary portion 51 of the system 50 via low frequency cables 58 and the rotary joint 54. The frequency multiplier 53 is coupled to the front end unit 16 via the electromagnetic waveguide 55. Moreover, the frequency multiplier 53 is coupled to the stationary portion 51 via low frequency cable 59 and the rotary joint 54.

Preferably, but not mandatory, the Tx and Rx antennas are in close proximity to each other. For example, an angle α at which the Tx and Rx antennas are arranged with respect to the center of rotation O' can be less than 30 degrees. This can provide for improved cross-range spatial resolution in concealed objects imaging.

It should be noted that although the Tx and Rx antennas are shown in FIGS. 6A and 6B to be arranged at the same distance from the center of rotation O', generally, the Tx and Rx antennas can be mounted at different distances from the center of rotation. In particular, when desired, one of the antenna elements (either Tx or Rx) can be mounted at the center of rotation O'.

It should be understood that generally, there is no limitation on the number of transmitting and/or receiving channels, since any desired number of lower frequency signals can be transferred between the rotating portion of the system and its stationary portion using slip-ring technique. Similar to the case of one Tx channel and one Rx channel, all higher frequency components can be arranged at a rotating portion, whereas all lower frequency components can be arranged at a stationary portion.

Figure 7:
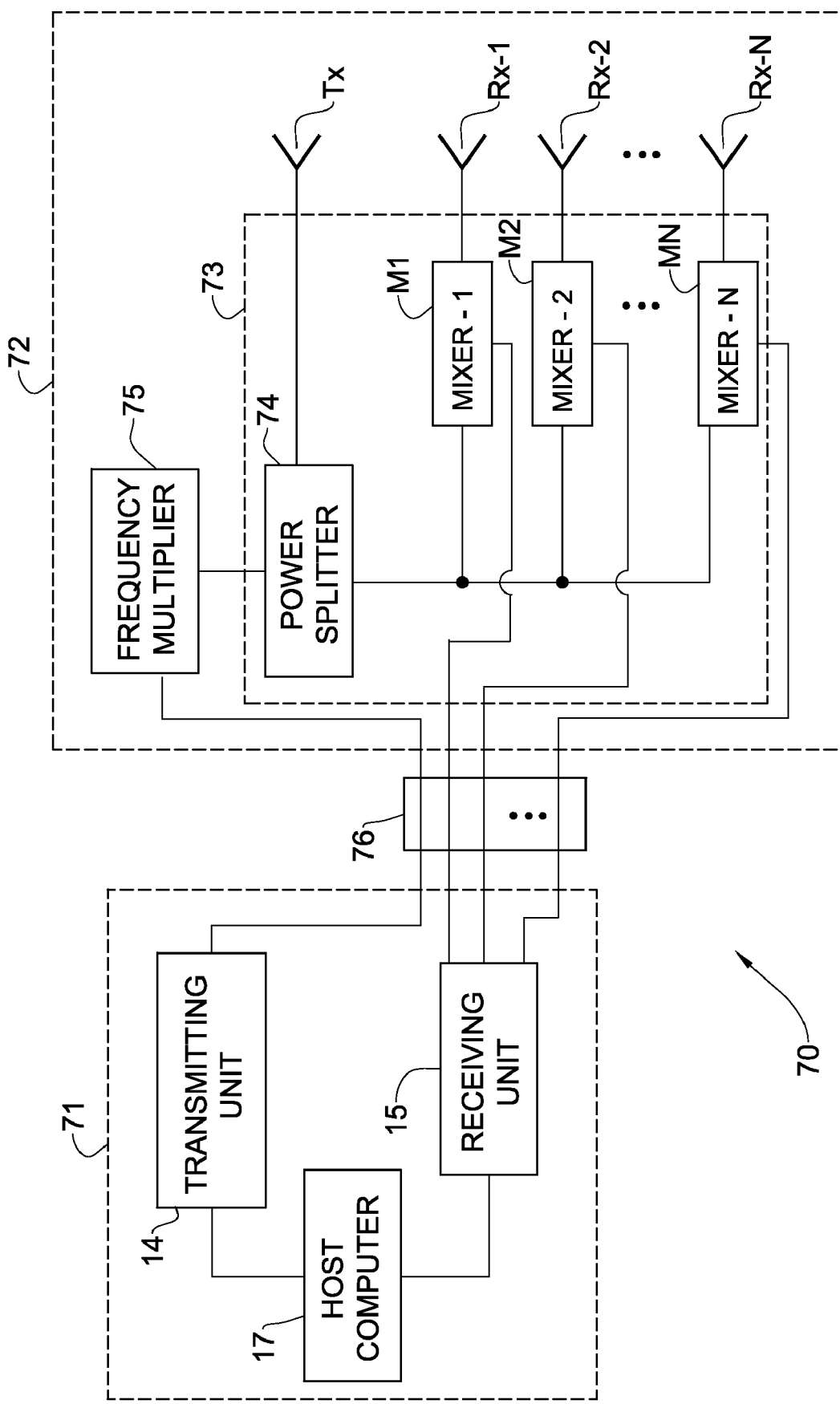
FIG. 7 illustrates a schematic block diagram of another embodiment of the imaging system of the invention in which higher frequency components are arranged at a rotating portion, whereas lower frequency components are arranged at a stationary portion.

Referring to FIG. 7, a schematic block diagram of an imaging system 70 of the invention employing one transmitting channel and a plurality of receiving channels is illustrated, according to one embodiment of the invention. A stationary portion 71 of the system is similar to the stationary portion 51 shown in FIG. 5. Likewise, rotating portion 72 comprises a frequency multiplier 75 and a front end unit 73 coupled to the multiplier 75 and to the antenna arrangement 10 including one transmitting antenna and a plurality of receiving antennas (sparse antenna array). According to this embodiment, the front end unit 73 of the rotating portion 72 differs from the rotating portion 52 shown in FIG. 5 in the fact that the front end unit 73 includes a plurality of mixers $M_1, M_2, \ldots, M_N$ coupled to a power splitter 74. Each mixer $M_i$ ($i=1, 2, \ldots, N$) is coupled to a corresponding receiving $Rx_i$ ($i=1, 2, \ldots, N$) antenna, thereby defining a corresponding i-th receiving channel. The power splitter 74 is coupled to the transmitting Tx antenna, thereby defining a transmitting channel.

The multiplier 75 is coupled to the transmitting unit 14 arranged at the stationary portion 71 via a low frequency rotary joint 76. Likewise, this low frequency rotary joint 76 is also used for coupling the mixers $M_1, M_2, \ldots, M_N$ of the front end unit 73 to the elements of the stationary portion 71. The front end unit 73 is coupled via the rotary joint 76, inter alia, to the receiving unit 15, to the control system (not shown), and to a power supply unit (not shown).

In one implementation of the system of the present invention, the antenna arrangement includes a rotating disk, on which one or more transmitting and receiving antennas are placed at the desired locations. On the rear side of the disk, the corresponding front end components (power splitter for the Tx antenna and the corresponding mixer for the Rx antenna) can placed near each of the antenna elements. When the front end components are mounted at a certain distance from the antenna elements, the connection between them should be implemented via waveguides. All connections with the stationary portion of the system should be via low frequency rotary joints and cables.

Figure 8A:
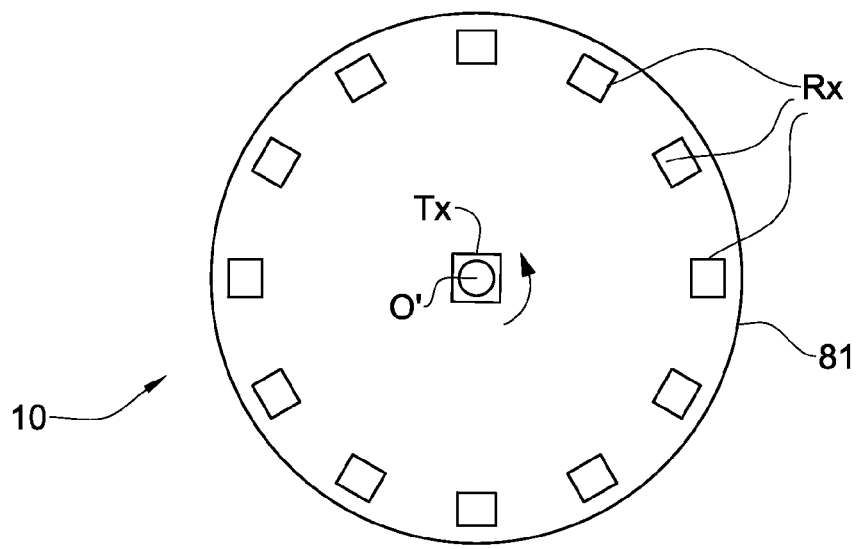
FIGS. 8A-8C illustrate different configurations of the antenna arrangement 10 of the imaging system 70 shown in FIG. 7.
Figure 8B:
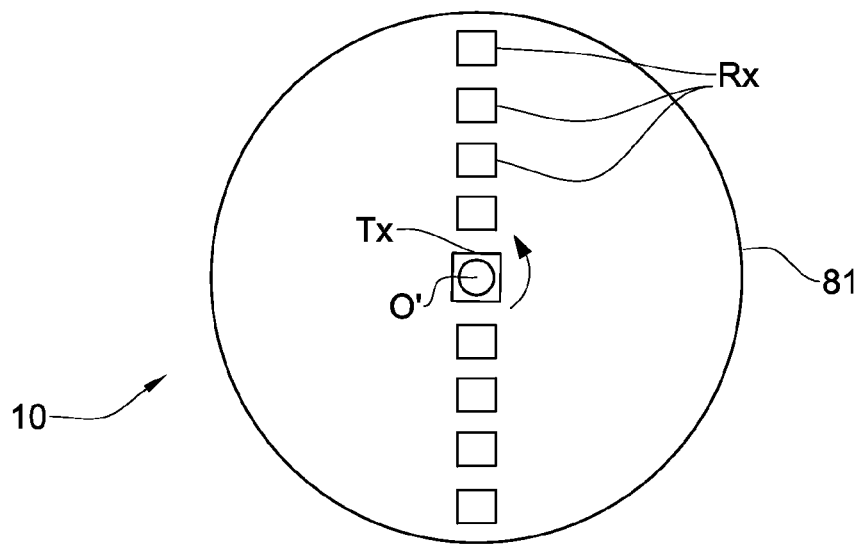
Figure 8C:
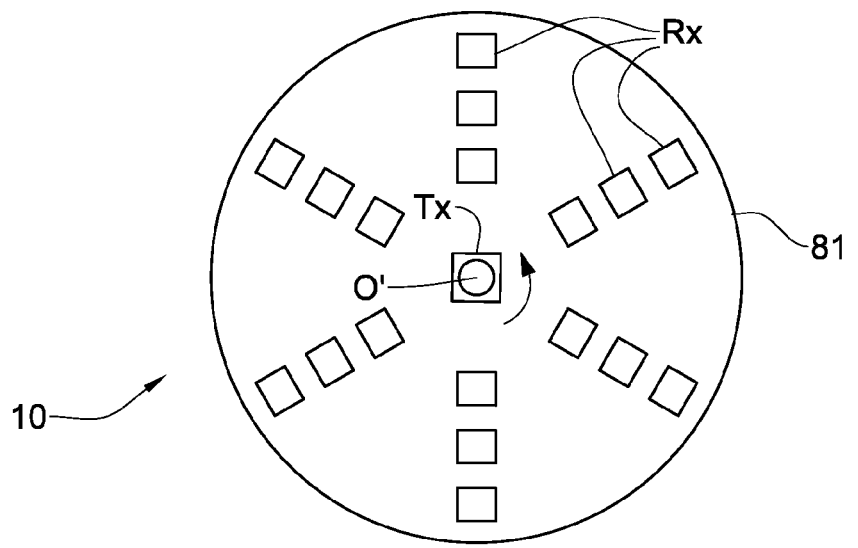

Referring to FIGS. 8A-8C together, different exemplary configurations of the antenna arrangement 10 of the imaging system 70 shown in FIG. 7 are illustrated. Specifically, FIG. 8A shows schematically a front view of the antenna arrangement 10 of the antenna arrangement 10 of the imaging system 70 shown in FIG. 7, according to one embodiment of the present invention. The plurality of receiving antennas Rx are distributed along the periphery of a circular disk 81, whereas one transmitting antenna Tx is mounted on the disk 81 at the center of rotation O'. It should be noted that generally, the transmitting antenna Tx can be mounted at any place on the disk 81. In operation, a frequency of the disk 81 for the embodiments shown in FIGS. 8A-8C can, for example, be in the range of 1 to 30 rev/sec. According to the embodiment shown in FIG. 8A, all of the transmitting antenna Tx are located at the same radius from the center of rotation O'. Generally, any two neighboring antennas Tx can be at any angle to each other. It should be noted that the antenna arrangement of such a configuration yields a higher effective rotation velocity when compared to the case of one transmitting antenna, and thus provides proper imaging for higher speed movement of the subject. However, slower rotation velocity may limit the speed of the subject at which imaging is possible.

FIG. 8B shows schematically a front view of the antenna arrangement 10 of the antenna arrangement 10 of the imaging system 70 shown in FIG. 7, according to another embodiment of the present invention. According to this embodiment, the antenna arrangement 10 includes a plurality of receiving antennas Rx distributed along a diameter of the circular disk 81, and one transmitting antenna Tx mounted on the disk 81 at the center of rotation O'. Generally, any two neighboring antennas Tx can be at any distances from each other. It should be noted that the antenna arrangement of such a configuration lowers antenna grating lobes and sidelobes, that improves the image quality when compared to the embodiment shown in FIG. 8A.

FIG. 8C shows schematically a front view of the antenna arrangement 10 of the antenna arrangement 10 of the imaging system 70 shown in FIG. 7, according to still another embodiment of the present invention. According to this embodiment, the antenna arrangement 10 includes a plurality of receiving antennas Rx distributed along the surface of the circular disk 81, and one transmitting antenna Tx mounted on the disk 81 at the center of rotation O'. It should be understood that the antenna arrangement 10 of this embodiment combines the advantages of the embodiments shown in FIGS. 8A and 8C.

Figure 9:
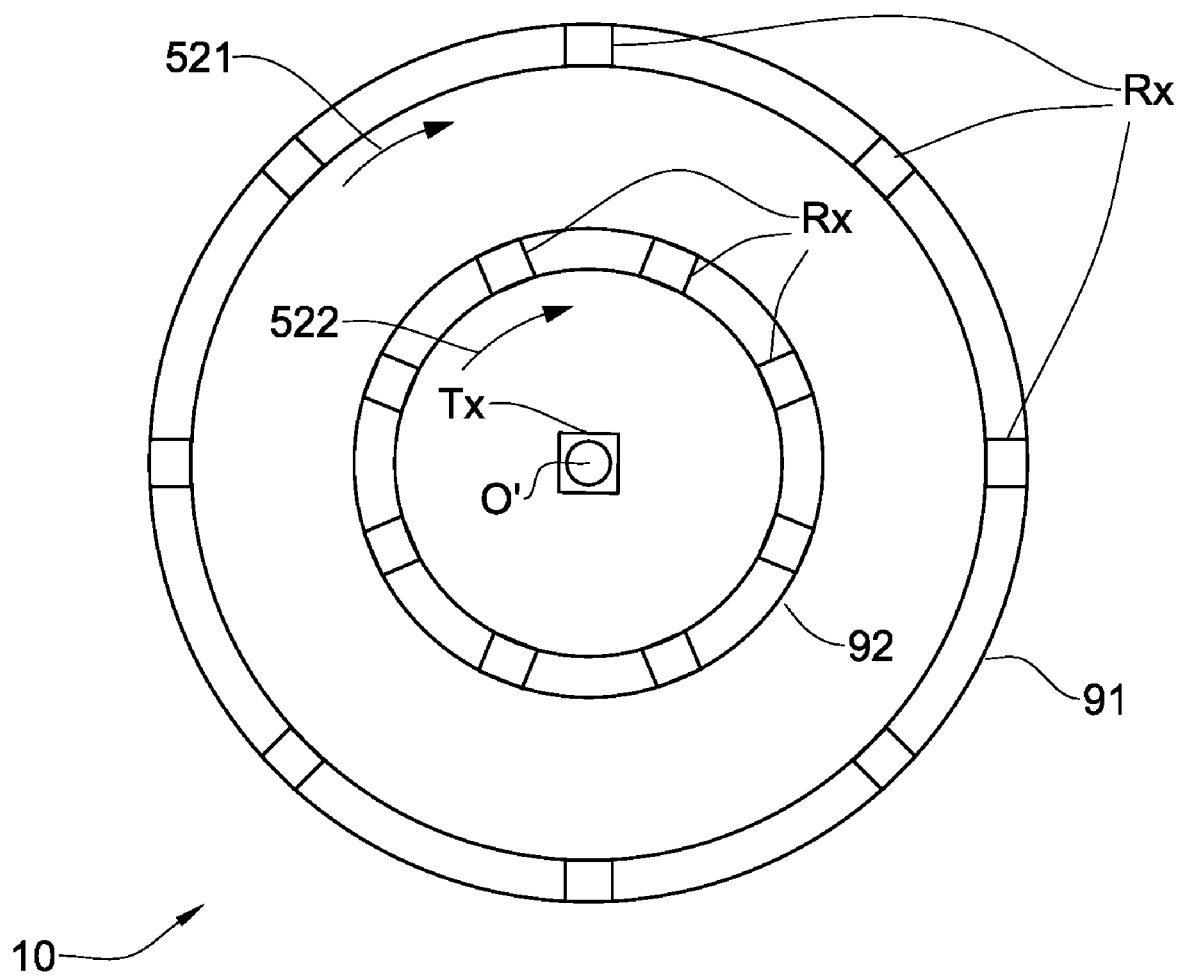
FIG. 9 shows schematically a configuration of the antenna arrangement including a plurality of Tx and Rx antennas rotating around a common center at different angular velocities.

When mounted on the same disk, all of the antennas participate in the rotation with the same angular velocity. However, when desired an antenna arrangement can include one or more Tx antennas and/or one and more Rx antennas rotating around a common center at different angular velocities. For example, the Tx and Rx antennas can be mounted on a plurality of rings rotating around a common center at different angular velocities. FIG. 9 shows schematically an example of such a configuration. According to this example, the antenna arrangement includes a first ring 91 and a second ring 92 on the rims of which the Rx antennas are mounted together with the corresponding components of the front end unit (not shown). The one transmitting antenna Tx is mounted at the center of rotation O'. In operation, the first ring 91 rotates at an angular velocity $\Omega_1$ different than the angular velocity $\Omega_2$ of the second ring 92. It should be noted that when desired the first and second rings 91 and 92 can rotate either in the same direction or in opposite directions.

Figure 10:
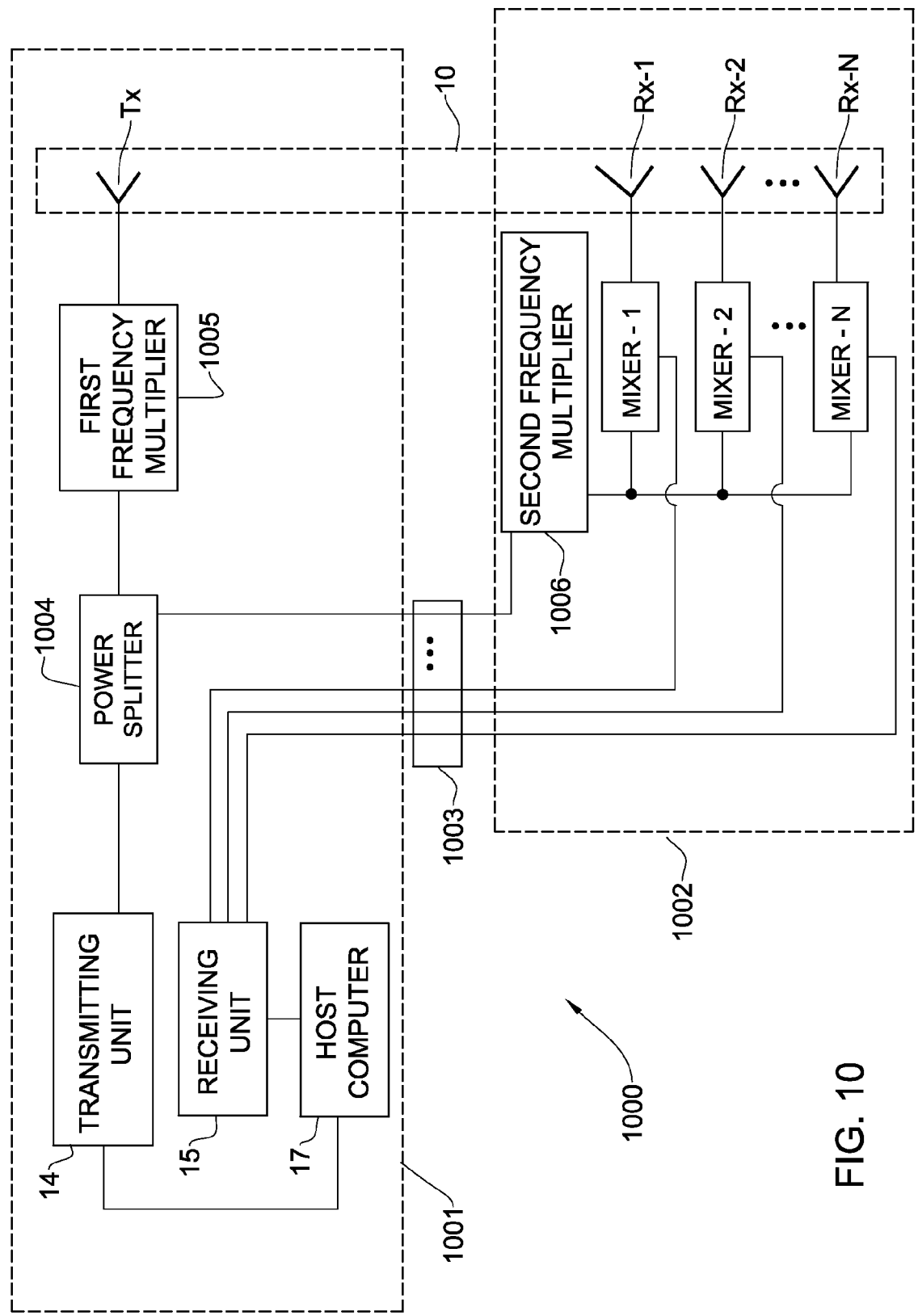
FIG. 10 is a schematic block diagram of an imaging system of the invention employing one transmitting channel and a plurality of receiving channels, according to a further embodiment of the invention.

Referring to FIG. 10, a schematic block diagram of an imaging system 1000 of the invention employing one transmitting channel and a plurality of receiving channels is illustrated, according to a further embodiment of the invention. According to this embodiment, a transmitting channel is included in a stationary portion 1001 of the system, whereas the plurality of receiving channels is included in a rotating portion 1002. The coupling between the stationary portion 1001 and the rotating portion 1002 is established via a low frequency rotary joint 1003.

Specifically, the stationary portion 1001 includes the transmitting unit 14, the receiving unit 15, and the host computer 17, which are similar to that of the stationary portion 51 shown in FIG. 5. The stationary portion 1001 further includes a power splitter 1004 coupled to the transmitting unit 14 and configured to split the lower frequency signal from the transmitting unit 14 into two portions relayed to a first frequency multiplier 1005 arranged at the stationary portion 1001, and to a second frequency multiplier 1006 arranged at the rotating portion 1002. The signal fed to the first frequency multiplier 1005 can, for example, be at the microwave frequency range below than 15 GHz, e.g., at X-band. This signal is up-converted by the first frequency multiplier 1005, and then relayed to the transmitting antenna Tx of the antenna arrangement 10.

The rotating portion 1002 also includes the plurality of mixers $M_1, M_2, \ldots, M_N$ coupled to the second frequency multiplier 106. The mixers $M_1, M_2, \ldots, M_N$ are indicated in FIG. 10 as MIXER-1, MIXER-2, . . . , MIXER-N. Each mixer $M_i$ (i=1, 2, . . . , N) is coupled to the corresponding receiving $Rx_i$ (i=1, 2, . . . , N) antenna, thereby defining a corresponding i-th receiving channel. In operation, signals received by the receiving antennas are mixed with the up-converted signal provided by the second frequency multiplier 1006, and then are relayed to the receiving unit 15 via the low frequency rotary joint 1003. When desired, the low frequency rotary joint 1003 can also used for coupling the rotating portion 1002 to a power supply unit (not shown).

Figure 11:
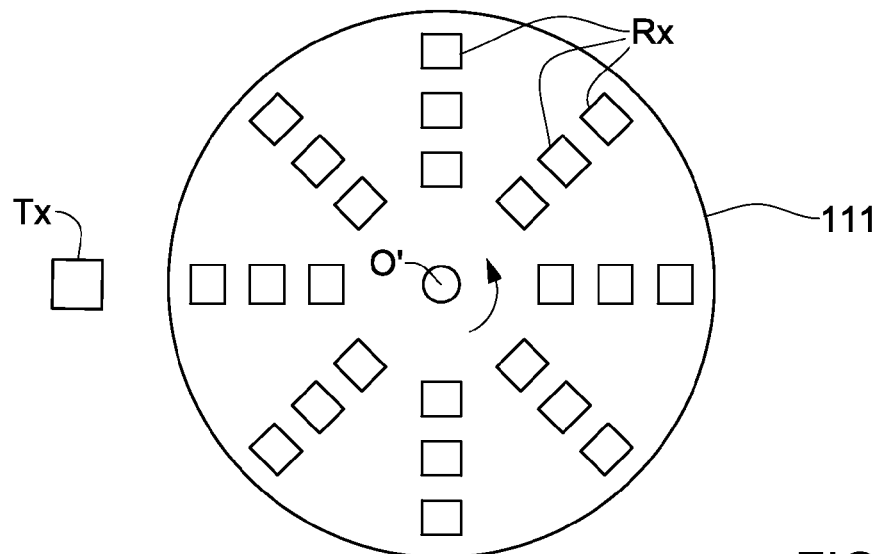
FIG. 11 shows a front view of the antenna arrangement of the antenna arrangement of the imaging system shown in FIG. 10, according to one another embodiment of the present invention.

FIG. 11 shows a front view of the antenna arrangement 10 of the imaging system 1000 shown in FIG. 10, according to another embodiment of the present invention. According to this embodiment, the antenna arrangement 10 forms a sparse antenna array, and includes a plurality of receiving antennas Rx distributed along the surface of a rotating circular disk 111, and one transmitting antenna Tx arranged in the vicinity of the receiving antennas Rx at a distance from the center of rotation O' larger than the radius of the disk 111.

It should be understood that when desired, the antenna arrangement 10 comprising one stationary Tx antenna and a plurality of rotating Rx antennas can have other configurations. For example, the plurality of Rx antennas can be arranged either at a periphery of the rotating disk or along the disk's radius. Likewise, the stationary Tx antenna can also be arranged ahead of the rotating disk either at the axis of the disk rotation or at any distance from the axis of rotation shorter than the maximal radius of the rotation of the transmitting antennas (or shorter than the radius of the disk).

Figure 12:
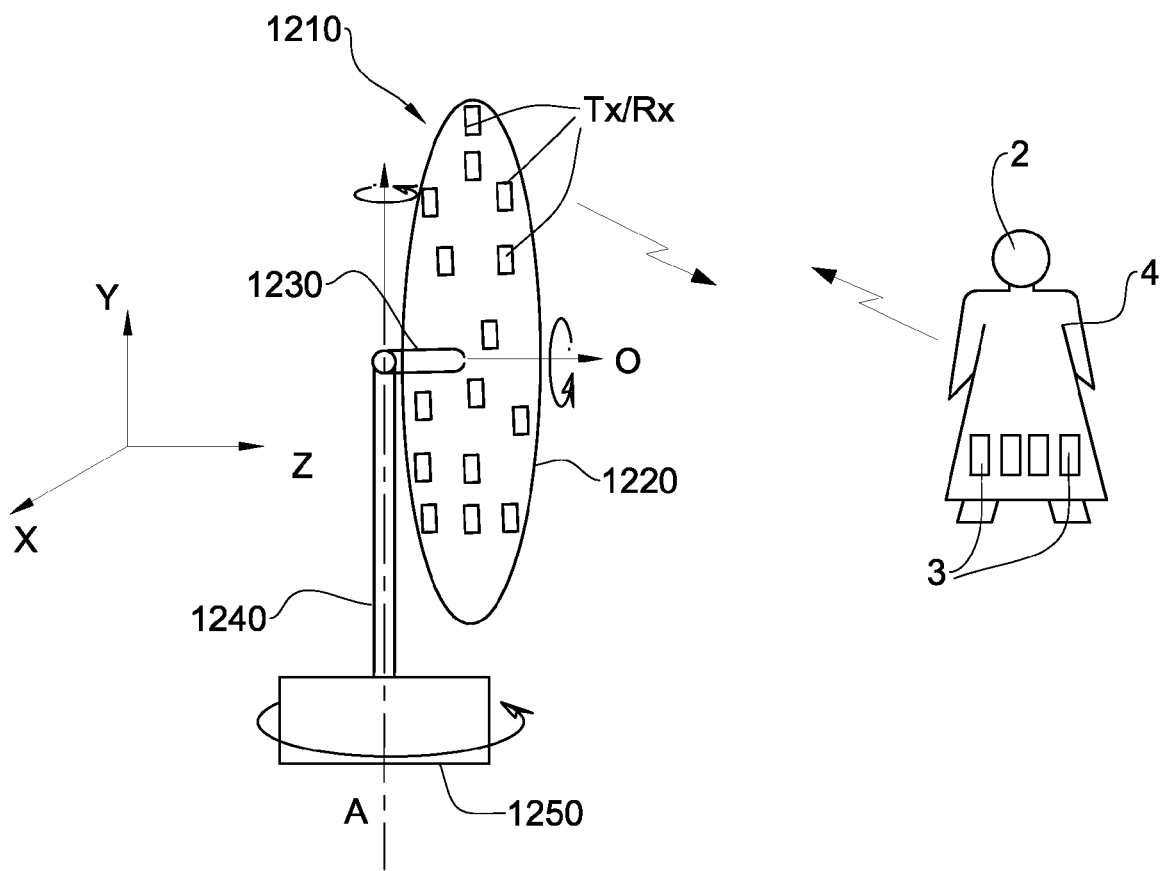
FIG. 12 shows a schematic view of an exemplary imaging system of the present invention in which a sparse antenna array of the antenna arrangement participates in a combined rotation, according to an embodiment of the present invention.

Referring to FIG. 12, a schematic view of an exemplary imaging system of the present invention is shown in which a sparse antenna array 1210 of the antenna arrangement 10 participates in a combined rotation, according to an embodiment of the present invention. Generally, the sparse antenna array 1210 of the antenna arrangement 10 includes one or more Rx antennas and one or more Tx antennas, in which at least one antenna element (either Tx antenna or Rx antenna) rotates around the axis O directed towards the target 2 including the object 3 concealed by the clothing material 4. As shown in FIG. 12, the antenna arrangement 10 includes a plurality of antenna Tx/Rx elements mounted on a disk 1220 rotating in the XY-coordinate plane around the axis O directed along the coordinate axis Z.

The disk 1220 is mounted on a horizontal shaft 1230 (first shaft) that defines the axis O. The horizontal shaft 1230 is fixed at a predetermined angle (e.g., at 90 degrees) to a vertical shaft 1240 (second shaft) mounted on a rotating support 1250 driven by a motor (not shown), thereby to provide rotation of the whole system around an axis A defined by the vertical shaft 1240. Thus, according to this embodiment of the invention, the horizontal shaft 1230 can itself be rotated in the coordinate plane XZ around the coordinate axis Y, so as to provide a partial or full 180° azimuthal field-of-view image of a scene. The net effect of the combined rotation is to produce a much more "dense" antenna array.

Thus, the combined rotation according to this embodiment has two degrees of freedom. The relative rotation velocities of rotation around the axis A and axis O can be adjusted to suit various purposes. For example, the rotation around the axis A can be faster than the rotation around the axis O.

It should be understood that when desired, the combined rotation can include three degrees of freedom.

Figure 13:
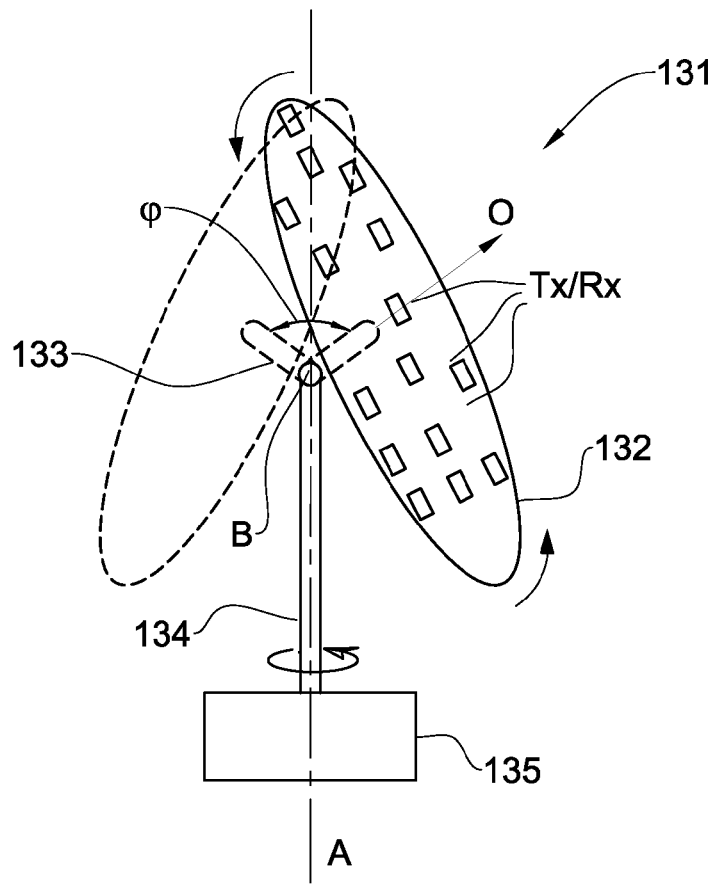
FIG. 13 is a schematic view of an exemplary imaging system, according to yet another embodiment of the present invention.

Referring to FIG. 13, a schematic view of an exemplary imaging system of the present invention is shown in which a sparse antenna array 131 of the antenna arrangement 10 participates in a combined motion including three degrees of freedom so as to provide a partial or full 360° field-of-view image of a scene. According to this embodiment, the Tx and/or Rx antennas are mounted on a disk 132 that may rotate around the axis O. The disk 132 is mounted on a first shaft 133 pivotably connected to a second shaft 134 to provide an elevation motion of the sparse antenna array 131. Two positions of the disk 132 and the first shaft 133 separated by an angle $\phi$ are shown in FIG. 13 by drawing with continuous and dashed lines. Further, the second shaft 134 is mounted on a rotating support 135 driven by a motor (not shown), thereby to provide azimuthal motion of the Tx and/or Rx antennas by rotating the whole system around an axis A defined by the vertical shaft 134.

It should be noted that the concept of the combined rotation is not bound to the specific configuration of the antenna arrangement 10 mounted on a disk. The combined rotation can also be employed for the Tx and/or Rx antennas arranged on a rotating arm or a ring.

It should be understood that when desired the active imaging system of the present invention can be combined with one or more video cameras for providing an optical image of the target and object(s) being imaged by the radar system. In this case, in addition to the millimeter wave radar one or more ordinary video cameras are placed somewhere in close proximity to the antenna arrangement so that the camera field of view would include the field of view of the antenna arrangement.

Figure 14:
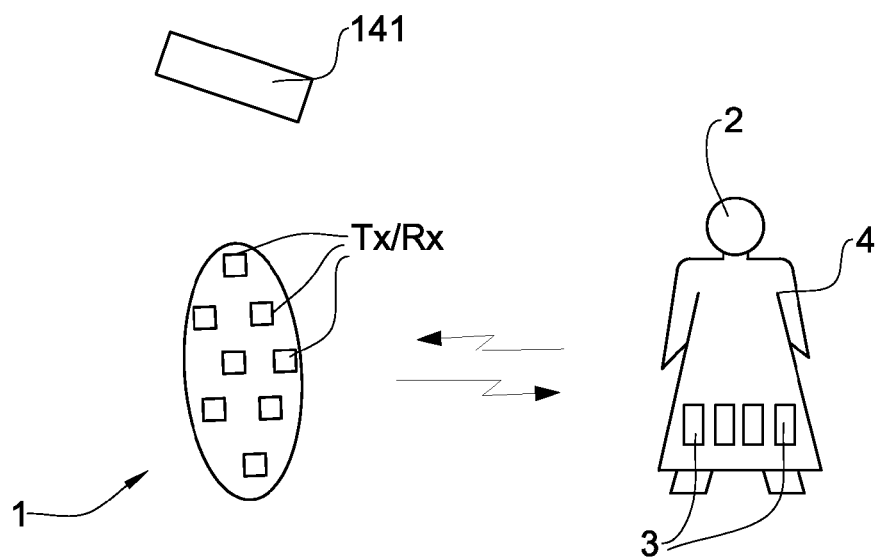
FIG. 14 shows a schematic view of using a video camera together with the active imaging system of the present invention, according to one embodiment of the invention.

Referring to FIG. 14, a schematic view of using a video camera 141 together with the active imaging system 1 for imaging the target 2 including one or more objects 3 is illustrated, according to one embodiment of the invention. The objects can be either visible or concealed by a clothing material 4. As shown in FIG. 14, the video camera 141 is arranged outside the rotation radius of the antenna elements Tx/Rx. It should be noted that when desired, the video camera can also be arranged ahead of the antennas elements Tx/Rx, for example, either at the axis of the rotation or at any distance from the axis of rotation shorter that the maximal radius of the rotation.

In operation, any detected threats on the target 2 could also be placed on the video image for more reliable viewing by an operator (not shown). Alternately, first, suitable technologies can be used for processing the video images and locating specific body parts of a target (person) being imaged. Then, it can be automatically identified on which part of the body any threat has been detected. This can be helpful in deciding whether a threat is real. As an example, if a result of radar imaging is a gun that is seen floating on top of the person's head, the reliability of the radar result must be questioned. On the other hand, special attention should be given by the operator to the target, when a result of the radar imaging is a gun located within the body of the target.

As such, those skilled in the art to which the present invention pertains, can appreciate that while the present invention has been described in terms of preferred embodiments, the conception, upon which this disclosure is based, may readily be utilized as a basis for the designing of other structures systems and processes for carrying out the several purposes of the present invention.

It is to be understood that although one the main advantages of the imaging system of the present invention is in the fact that it can improve remote (standoff) imaging of threat objects out to a range greater than five meters, this system can also be applied to close-up detection, i.e., at the distances less than five meters.

It should be understood that although the concept of the present invention for active imaging a target have been described for the technique employing rotating antenna(e) forming a synthetic aperture, this concept can also be applied to the technique in which the rotating antenna(e) is(are) replaced with a large number of stationary transmitting/receiving antenna elements, thus forming a real circular aperture. The function of the rotating antenna(e) is primarily to allow a significant reduction in the number of transmitting/receiving antenna(e) required.

Although this invention has been described via embodiments based on radar antennas, it is not intended that the present invention be limited to radar signals. A person versed in the art may employ numerous other sensors that could be used to practice the present invention. Further, the person versed in the art can understand how the described embodiment could be modified to accommodate other sensors. For example, the present invention could be used with sonar sensors. Further, various types of radars and other sensors could be combined in the same system.

It is to be understood that the phraseology and terminology employed herein are for the purpose of description and should not be regarded as limiting.

Finally, it should be noted that the word "comprising" as used throughout the appended claims is to be interpreted to mean "including but not limited to".

It is important, therefore, that the scope of the invention is not construed as being limited by the illustrative embodiments set forth herein. Other variations are possible within the scope of the present invention as defined in the appended claims. Other combinations and sub-combinations of features, functions, elements and/or properties may be claimed through amendment of the present claims or presentation of new claims in this or a related application. Such amended or new claims, whether they are directed to different combinations or directed to the same combinations, whether different, broader, narrower or equal in scope to the original claims, are also regarded as included within the subject matter of the present description.

What is claimed is:

1. An active imaging system for imaging a target, the system comprising:
 a transmitting unit configured to generate electromagnetic radiation signal in microwave wave frequency range for scanning the target;
 a receiving unit configured to receive microwave radiation re-radiated from the target;
 an antenna arrangement coupled to said transmitting unit and said receiving unit via a front end unit, and configured for transmitting and receiving electromagnetic radiation signal in the microwave wave frequency range, wherein said antenna arrangement includes a sparse array of unitary antennas operating for receiving and transmitting the electromagnetic radiation and including a plurality of antenna elements forming a synthetic antenna configured for rotating about an axis passing through a phase center of said synthetic antenna and orthogonal to a plane of the sparse array so as to fill in an aperture of said synthetic antenna;
 wherein the antenna arrangement comprises a rotating arm including:
  an electromagnetic circular waveguide connected to the front-end unit,
  a quasi-optical transition element connected to the electromagnetic circular waveguide for providing quasi-optical to electromagnetic waveguide transition,
  a quasi-optical waveguide rotary joint, and
  a quasi-optical waveguide connected to the quasi-optical waveguide rotary joint at one end of the quasi-optical waveguide;
  thereby forming a rotating antenna by allowing the electromagnetic wave to enter or to exit the quasi-optical waveguide directly through an outer end of the quasi-optical waveguide;
 an image processing unit coupled to the receiving unit and preprogrammed by a mathematical model configured for analyzing received electromagnetic radiation signal and creating an image of at least one object located within the target by employing an imaging algorithm which includes synthetic aperture processing; and
 a control system coupled to at least one of the following units: said transmitting unit, said receiving unit and said image processing unit; and configured for controlling operation thereof.

2. The system of claim 1, further comprising:
 another quasi-optical transition element,
 another circular waveguide downstream of said another quasi-optical transition element, and
 an antenna element connected to said another circular waveguide.

3. The system of claim 1, wherein the antenna arrangement further comprises a stationary arm comprising:
 a stationary antenna;
 a quasi-optical waveguide for coupling the stationary antenna to the front end unit; and
 an RF electromagnetic waveguide for coupling the stationary antenna to the front end unit.

4. The system of claim 3, wherein the stationary antenna is maintained in the vicinity of the rotating arm, while at a place which is arranged at a distance from the axis of rotation larger than the radius of a circle formed by the rotating antenna.

5. The system of claim 3, wherein the stationary antenna is located ahead of the rotating arm at a predetermined distance from the axis of rotation shorter than the radius of a circle formed by the rotating antenna.

6. The system of claim 1, further comprising a frequency multiplier downstream of the transmitting unit and upstream of the front end unit.

7. The system of claim 6, wherein said transmitting unit, said receiving unit, said control system, and said image processing unit are mounted in a stationary portion of the system, whereas frequency multiplier, the front end unit and the antenna arrangement are mounted in a rotating portion of the system.

8. An active imaging system for imaging a target, the system comprising:
 a transmitting unit configured to generate electromagnetic radiation signal in microwave wave frequency range for scanning the target;
 a receiving unit configured to receive microwave radiation re-radiated from the target;
 an antenna arrangement coupled to said transmitting unit and said receiving unit via a front end unit, and configured for transmitting and receiving electromagnetic radiation signal in the microwave wave frequency range, wherein said antenna arrangement includes a sparse array of unitary antennas operating for receiving and transmitting the electromagnetic radiation and including a plurality of antenna elements forming a synthetic antenna configured for rotating about an axis passing through a phase center of said synthetic antenna and orthogonal to a plane of the sparse array so as to fill in an aperture of said synthetic antenna;
 wherein the antenna arrangement includes a plurality of rotating receiving antennas distributed on a disk, and at least one stationary transmitting antenna arranged in the vicinity to the receiving antennas at a distance from the center of rotation of the disk larger than the radius of the disk;
 an image processing unit coupled to the receiving unit and preprogrammed by a mathematical model configured for analyzing received electromagnetic radiation signal and creating an image of at least one object located within the target by employing an imaging algorithm which includes synthetic aperture processing; and
 a control system coupled to at least one of the following units: said transmitting unit, said receiving unit and said image processing unit; and configured for controlling operation thereof.

9. The system of claim 8, wherein said plurality of receiving antennas is arranged at different distances from the center of rotation.

10. An active imaging system for imaging a target, the system comprising:
 a transmitting unit configured to generate electromagnetic radiation signal in microwave wave frequency range for scanning the target;
 a receiving unit configured to receive microwave radiation re-radiated from the target;
 an antenna arrangement coupled to said transmitting unit and said receiving unit via a front end unit, and configured for transmitting and receiving electromagnetic radiation signal in the microwave wave frequency range, wherein said antenna arrangement includes a sparse array of unitary antennas operating for receiving and transmitting the electromagnetic radiation and including a plurality of antenna elements forming a synthetic antenna configured for rotating about an axis passing through a phase center of said synthetic antenna and orthogonal to a plane of the sparse array so as to fill in an aperture of said synthetic antenna;

wherein the antenna arrangement includes a plurality of rotating receiving antennas distributed on a disk, and at least one stationary transmitting antenna arranged ahead of the rotating disk at a distance from the axis of rotation shorter than the radius of the disk;

an image processing unit coupled to the receiving unit and preprogrammed by a mathematical model configured for analyzing received electromagnetic radiation signal and creating an image of at least one object located within the target by employing an imaging algorithm which includes synthetic aperture processing; and a control system coupled to at least one of the following units: said transmitting unit, said receiving unit and said image processing unit; and configured for controlling operation thereof.

11. The system of claim 8, further comprising a video camera arranged outside the rotation radius of the rotating antenna.

* * * * *